(12) United States Patent
Mano et al.

(10) Patent No.: US 10,870,328 B2
(45) Date of Patent: Dec. 22, 2020

(54) FLOW PASSAGE SWITCHING VALVE

(71) Applicants: DENSO CORPORATION, Kariya (JP); FUJIKOKI CORPORATION, Tokyo (JP)

(72) Inventors: Takamitsu Mano, Kariya (JP); Yasumitsu Omi, Kariya (JP); Kenichi Mochizuki, Tokyo (JP); Takayuki Matsumoto, Tokyo (JP)

(73) Assignees: DENSO CORPORATION, Kariya (JP); FUJIKOKI CORPORATION, Tokyo (JP)

( * ) Notice: Subject to any disclaimer, the term of this patent is extended or adjusted under 35 U.S.C. 154(b) by 55 days.

(21) Appl. No.: 16/301,836

(22) PCT Filed: Apr. 13, 2017

(86) PCT No.: PCT/JP2017/015185
§ 371 (c)(1),
(2) Date: Nov. 15, 2018

(87) PCT Pub. No.: WO2017/199654
PCT Pub. Date: Nov. 23, 2017

(65) Prior Publication Data
US 2019/0160910 A1 May 30, 2019

(30) Foreign Application Priority Data

May 19, 2016 (JP) .................. 2016-100866

(51) Int. Cl.
*B60H 1/00* (2006.01)
*F16K 11/085* (2006.01)
(Continued)

(52) U.S. Cl.
CPC ..... *B60H 1/00485* (2013.01); *B60H 1/00885* (2013.01); *F16K 5/04* (2013.01);
(Continued)

(58) Field of Classification Search
CPC .... F16K 5/0464; F16K 5/0471; F16K 5/0478; F16K 11/076; F16K 11/085; F16K 11/0853; F16K 11/0856; B60H 1/00885
(Continued)

(56) References Cited

U.S. PATENT DOCUMENTS 2,547,116 A * 4/1951 Gould ............... F16K 5/0478
251/309
3,217,749 A * 11/1965 Greenwald ......... F25B 41/04
137/625.18
(Continued)

FOREIGN PATENT DOCUMENTS

CN 2504457 Y 8/2002
JP 2015034560 A 2/2015

*Primary Examiner* — Kevin F Murphy
(74) *Attorney, Agent, or Firm* — Harness, Dickey & Pierce, P.L.C.

(57) ABSTRACT

The sealing member includes a first sealing part and a second sealing part and a joining part connecting together the first sealing part and the second sealing part. The first sealing part extends to surround a peripheral edge of the first opening hole on the main body inner peripheral surface side. The second sealing part extends to surround a peripheral edge of the second opening hole on the main body inner peripheral surface side. The joining part is placed at a position where a mutual interval between the first sealing part and the second sealing part is the smallest in the circumferential direction. Each of the first joining end portion and the second joining end portion of the joining part is pressed outward in the valve radial direction by the valve body outer peripheral surface to be resiliently deformed.

11 Claims, 20 Drawing Sheets

(51) Int. Cl.
*F16K 5/04* (2006.01)
*F16K 11/076* (2006.01)
*F16K 25/00* (2006.01)

(52) U.S. Cl.
CPC .......... *F16K 5/0471* (2013.01); *F16K 11/076* (2013.01); *F16K 11/085* (2013.01); *F16K 25/00* (2013.01)

(58) Field of Classification Search
USPC ........................................................ 251/317
See application file for complete search history.

(56) References Cited

U.S. PATENT DOCUMENTS 3,232,579 A  2/1966 Jeffrey
2006/0196470 A1* 9/2006 Keller .............. F02M 35/10085
                                                    123/400

* cited by examiner

FLOW PASSAGE SWITCHING VALVE

CROSS REFERENCE TO RELATED APPLICATIONS

This application is a U.S. National Phase Application under 35 U.S.C. 371 of International Application No. PCT/JP2017/015185 filed on Apr. 13, 2017. This application is based on and claims the benefit of priority from Japanese Patent Application No. 2016-100866 filed on May 19, 2016. The entire disclosures of all of the above applications are incorporated herein by reference.

TECHNICAL FIELD

The present disclosure relates to a flow passage switching valve to switch or open/close a flow passage through which a fluid flows.

BACKGROUND ART

As such a flow passage switching valve, a flow passage switching valve described in Patent Document 1 for example has heretofore been known. The flow passage switching valve described in Patent Document 1 has a rotary driving device (namely a driving part) including a motor and the like, a valve main body, a sealing member, and a valve body. In the valve main body, a valve chamber and an outlet communicating with the valve chamber are formed. The sealing member comprises a resilient material and is arranged in the valve chamber. The sealing member has a cylindrical body in which a plurality of through-holes are formed side by side in a circumferential direction, an outer rib, and an inner rib. The outer rib of the sealing member is projected outward from the outer peripheral surface of the cylindrical body along the circumference of the through-holes of the cylindrical body and the inner rib is projected inward from the inner circumferential surface of the cylindrical body along the circumference of the through-holes.

The valve body has a valve spindle connected to the rotary driving device and a valve body part accommodated inside the sealing member in the valve chamber. Further, the inner rib of the sealing member abuts the outer peripheral surface of the valve body part and the outer rib of the sealing member abuts the inner circumferential surface forming the valve chamber of the valve main body.

Then the flow passage switching valve of Patent Document 1 opens and closes or switches the outlet of the valve main body by rotating the valve body part through the valve spindle with the rotary driving device. On this occasion, the valve body part rotates and slides relatively to the inner rib of the sealing member in accordance with the rotation of the valve body part.

PRIOR ART DOCUMENT

Patent Document

Patent Document 1: JP 2015-34560 A

SUMMARY OF INVENTION

In the flow passage switching valve of Patent Document 1 stated above, a valve body opening that is a hole communicating with the outlet of the valve main body is formed at the valve body part of the valve body. The valve body opening: opens outward in a radial direction of the valve body part; and rotates also naturally when the valve body rotates. Then when the inner rib of the sealing member overlaps with the periphery of the valve body opening at a certain rotation position of the valve body, the inner rib: is released from a state of being pressed by the outer peripheral surface of the valve body part; and gets slightly into the valve body opening.

When the valve body rotates further from the rotation position of such a state, the inner rib of the sealing member returns from the released state of getting slightly into the valve body opening to the pressed state again. On this occasion, the inner rib is caught by the periphery of the valve body opening and the rotation of the valve body is hindered. That is, during the course of rotating the valve body, the valve body is caught by the inner rib temporarily when the inner rib of the sealing member returns from the released state to the pressed state and hence the rotation torque for rotating the valve body increases temporarily.

In such variation of a rotation torque accompanying the rotation of the valve body, when the rotation torque increases temporarily, the driving part to rotate the valve body of the flow passage switching valve need to be able to output a torque of equal to a peak torque or more that is the maximum torque when the rotation torque increases temporarily.

In a flow passage switching valve therefore, generally a driving part conforming to a peak torque (namely, the maximum value of a rotation torque) is adopted and the catch of the inner rib of the sealing member stated above causes the peak torque to increase in the flow passage switching valve of Patent Document 1. Then in the flow passage switching valve of Patent Document 1, since a measure for inhibiting the catch of the inner rib is not taken, it has been difficult to attempt to downsize a flow passage switching valve including a driving part. The present inventors have obtained the above findings as a result of detailed studies.

The present disclosure addresses the above issues. Thus, it is an objective of the present disclosure to provide a flow passage switching valve capable of downsizing a driving part to rotate a valve body by reducing the maximum value of a torque to rotate the valve body.

To achieve the objective, a flow passage switching valve in an aspect of the present disclosure switches a flow passage through which fluid flows, or opens or closes the flow passage. The valve includes a valve body that rotates around a valve axis and includes a valve body outer peripheral surface, which faces outward in a valve radial direction and extends to surround the valve axis, the valve radial direction being a radial direction of the valve axis, a valve main body that includes a valve chamber accommodating the valve body, and a main body inner peripheral surface opposed to the valve body outer peripheral surface and facing the valve chamber, and a resilient sealing member that is accommodated in the valve chamber and is placed outward of the valve body in the valve radial direction to be interposed between the valve body outer peripheral surface and the main body inner peripheral surface in the valve radial direction. The valve main body further includes a first opening hole and a second opening hole each passing through the valve main body from the valve chamber in the valve radial direction. The second opening hole is located side by side with the first opening hole in a circumferential direction of the valve axis. The valve body includes one or at least two valve body openings that open outward in the valve radial direction. The one or at least two valve body openings communicate with one of the first opening hole and the second opening hole in accordance with a rotation position of the valve body. The sealing member includes a first sealing part and a second sealing part each being clamped between the valve body outer peripheral surface and the main body inner peripheral surface, and a joining part connecting together the first sealing part and the second sealing part. The first sealing part extends to surround a peripheral edge of the first opening hole on the main body inner peripheral surface side. When one opening of the one or at least two valve body openings communicates with the first opening hole, the first sealing part prevents a leak of the fluid flowing between the one opening and the first opening hole. The second sealing part extends to surround a peripheral edge of the second opening hole on the main body inner peripheral surface side. When the one opening of the one or at least two valve body openings communicates with the second opening hole, the second sealing part prevents a leak of the fluid flowing between the one opening and the second opening hole. The joining part includes a first joining end portion connected to the first sealing part and a second joining end portion connected to the second sealing part, and is placed at a position where a mutual interval between the first sealing part and the second sealing part is the smallest in the circumferential direction. Each of at least the first joining end portion and the second joining end portion of the joining part is pressed outward in the valve radial direction by the valve body outer peripheral surface to be resiliently deformed.

As stated above, the joining part of the sealing member includes a first joining end portion connected to the first sealing part and a second joining end portion connected to the second sealing part, and is placed at a position where a mutual interval between the first sealing part and the second sealing part is the smallest in the circumferential direction. Each of at least the first joining end portion and the second joining end portion of the joining part are pressed outward in the valve radial direction by the valve body outer peripheral surface to be resiliently deformed. Consequently, the unevenness of the sealing member in a radially inward direction is inhibited and the first sealing part and the second sealing part are not easily caught by the peripheral edge of the valve body opening when the valve body rotates. As a result, the maximum value of the torque to rotate the valve body can be reduced. Then by reducing the maximum value of the torque to rotate the valve body, it is possible to downsize the driving part to rotate the valve body.

BRIEF DESCRIPTION OF DRAWINGS

The above and other objects, features and advantages of the present disclosure will become more apparent from the following detailed description made with reference to the accompanying drawings. In the drawings.

EMBODIMENTS FOR CARRYING OUT INVENTION

Figure 1:
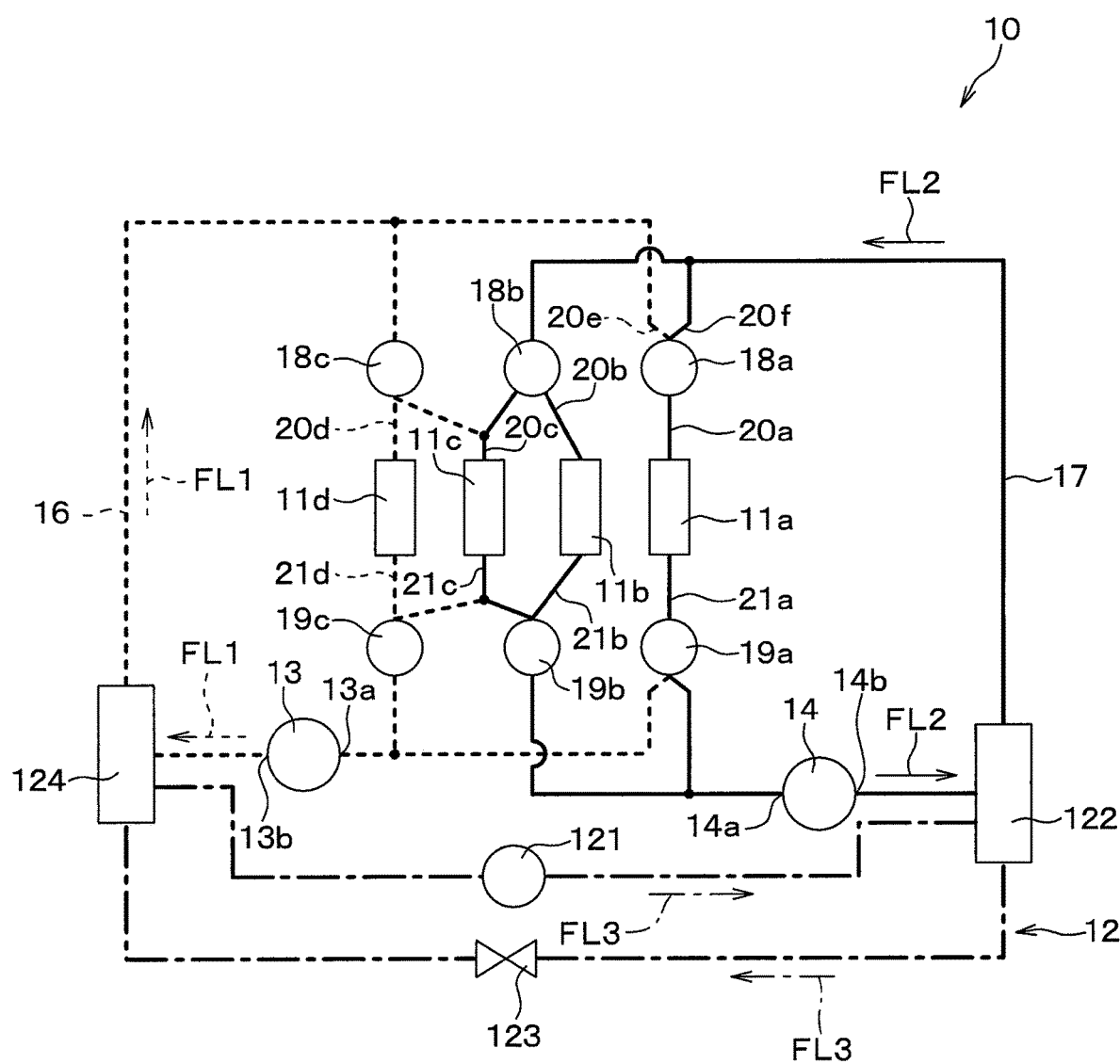
FIG. 1 is a block diagram showing a general configuration of a heat management system in which a flow passage switching valve according to a first embodiment is used.

Embodiments according to the present disclosure are explained hereunder in reference to the drawings. Here, in the following embodiments, parts identical or equivalent to each other are represented by an identical reference sign in the drawings.

First Embodiment

FIG. 1 is a block diagram showing a general configuration of a heat management system 10 according to the present embodiment. The heat management system 10 shown in FIG. 1 is a system mounted on an automobile such as a hybrid vehicle for example. The heat management system 10 generates cold water and warm water by a refrigeration cycle 12 and carries out cooling or temperature control by supplying the cold water and the warm water to a plurality of devices 11a, 11b, 11c, and 11d including a heat exchanger for air conditioning. As the devices 11a, 11b, 11c, and 11d, an inverter, a traveling engine, an electric motor, and a battery are named for example.

In other words, the heat management system 10 circulates cold water as a first heat exchange medium and warm water as a second heat exchange medium having a temperature higher than the cold water. Then the heat management system 10 switches and supplies the cold water and the warm water alternatively to the plurality of devices 11a, 11b, 11c, and 11d respectively. Here, in FIG. 1, the arrow FL1 shows the flow direction of the cold water, the arrow FL2 shows the flow direction of the warm water, and the arrow FL3 shows the flow direction of a refrigerant in the refrigeration cycle 12. Further, each of the first heat exchange medium and the second heat exchange medium in the present embodiment is an aqueous solution, namely a liquid, containing an antifreezing solution but may be a gas.

As shown in FIG. 1, the heat management system 10 has, as main constituent components, a refrigeration cycle 12, a cold water pump 13, a warm water pump 14, a cold water supply channel 16, a warm water supply channel 17, a plurality of inlet-side switching valves 18a, 18b, and 18c, those being three-way valves, and a plurality of outlet-side switching valves 19a, 19b, and 19c, those being three-way valves.

The refrigeration cycle 12 cools the cold water circulating in the heat management system 10 and also heats the warm water circulating in the heat management system 10. In short, the refrigeration cycle 12 plays the role of a heat pump of transferring heat from the cold water to the warm water.

The refrigeration cycle 12 is a vapor compression refrigeration cycle and has a compressor 121, a water-cooled condenser 122, an expansion valve 123, and a chiller 124. Those constituent instruments 121, 122, 123, and 124 are connected circularly through pipes and constitute a refrigerant circulation channel in which a refrigerant circulates.

The compressor 121 inhales a refrigerant from the chiller 124, compresses the inhaled refrigerant, and then discharges the refrigerant to the water-cooled condenser 122. The water-cooled condenser 122 is a heat exchanger to exchange heat between the refrigerant and warm water. The water-cooled condenser 122 condenses the refrigerant and heats the warm water by dissipating heat from the refrigerant to the warm water.

A refrigerant flows from the water-cooled condenser 122 in the expansion valve 123. The expansion valve 123 depressurizes and expands the refrigerant flowing in from the water-cooled condenser 122 and lets the depressurized and expanded refrigerant flow toward the chiller 124. The chiller 124 is a heat exchanger to exchange heat between the refrigerant and cold water. The refrigerant flows in the chiller 124 from the expansion valve 123 and the chiller 124 vaporizes the refrigerant and cools the cold water by transferring heat from the cold water to the refrigerant.

The cold water pump 13 has a cold water suction port 13a and a cold water discharge port 13b and discharges the cold water sucked through the cold water suction port 13a through the cold water discharge port 13b. The cold water discharged through the cold water discharge port 13b is cooled by the chiller 124 and then flows toward the cold water supply channel 16.

The warm water pump 14 has a warm water suction port 14a and a warm water discharge port 14b and discharges the warm water sucked through the warm water suction port 14a through the warm water discharge port 14b. The warm water discharged through the warm water discharge port 14b is heated by the water-cooled condenser 122 and then flows toward the warm water supply channel 17.

The switching valves 18a, 18b, 18c, 19a, 19b, and 19c respectively switch the flow of a fluid as cold water or warm water in the heat management system 10. In detail, the first inlet-side switching valve 18a is a flow passage switching valve to connect the cold water supply channel 16 and the warm water supply channel 17 alternatively to a first inlet pipe 20a connected to the inlet side of the first device 11a. Further, the first outlet-side switching valve 19a is a flow passage switching valve to connect a first outlet pipe 21a connected to the outlet side of the first device 11a to the cold water suction port 13a of the cold water pump 13 and the warm water suction port 14a of the warm water pump 14 alternatively.

Cold water or warm water flowing from the first inlet pipe 20a into the first device 11a flows toward the first outlet pipe 21a after the heat is exchanged inside the first device 11a. That is, the first device 11a is cooled by cold water when the cold water flows in the first device 11a and is heated by warm water when the warm water flows in the first device 11a.

The first inlet-side switching valve 18a and the first outlet-side switching valve 19a operate in conjunction with each other. In detail, when the first inlet-side switching valve 18a connects the cold water supply channel 16 to the first inlet pipe 20a, the first outlet-side switching valve 19a connects the first outlet pipe 21a to the cold water suction port 13a of the cold water pump 13. On this occasion, the port of the first inlet-side switching valve 18a connected to the warm water supply channel 17 is closed by the first inlet-side switching valve 18a and the port of the first outlet-side switching valve 19a connected to the warm water suction port 14a of the warm water pump 14 is closed by the first outlet-side switching valve 19a.

Inversely, when the first inlet-side switching valve 18a connects the warm water supply channel 17 to the first inlet pipe 20a, the first outlet-side switching valve 19a connects the first outlet pipe 21a to the warm water suction port 14a of the warm water pump 14. On this occasion, the port of the first inlet-side switching valve 18a connected to the cold water supply channel 16 is closed by the first inlet-side switching valve 18a and the port of the first outlet-side switching valve 19a connected to the cold water suction port 13a of the cold water pump 13 is closed by the first outlet-side switching valve 19a.

The second inlet-side switching valve 18b is a flow passage switching valve to connect the second inlet pipe 20b connected to the inlet side of the second device 11b and the third inlet pipe 20c connected to the inlet side of the third device 11c alternatively to the warm water supply channel 17. Further, the second outlet-side switching valve 19b is a flow passage switching valve to connect the second outlet pipe 21b connected to the outlet side of the second device 11b and the third outlet pipe 21c connected to the outlet side of the third device 11c alternatively to the warm water suction port 14a of the warm water pump 14.

Warm water flowing from the second inlet pipe 20b into the second device 11b flows toward the second outlet pipe 21b after the heat is exchanged inside the second device 11b. That is, when warm water flows in the second device 11b, the second device 11b is heated by the warm water.

The second inlet-side switching valve 18b and the second outlet-side switching valve 19b operate in conjunction with each other. In detail, when the second inlet-side switching valve 18b connects the second inlet pipe 20b to the warm water supply channel 17, the second outlet-side switching valve 19b connects the second outlet pipe 21b to the warm water suction port 14a of the warm water pump 14. On this occasion, the port of the second inlet-side switching valve 18b connected to the third inlet pipe 20c is closed by the second inlet-side switching valve 18b and the port of the second outlet-side switching valve 19b connected to the third outlet pipe 21c is closed by the second outlet-side switching valve 19b.

Inversely, when the second inlet-side switching valve 18b connects the third inlet pipe 20c to the warm water supply channel 17, the second outlet-side switching valve 19b connects the third outlet pipe 21c to the warm water suction port 14a of the warm water pump 14. On this occasion, the port of the second inlet-side switching valve 18b connected to the second inlet pipe 20b is closed by the second inlet-side switching valve 18b and the port of the second outlet-side switching valve 19b connected to the second outlet pipe 21b is closed by the second outlet-side switching valve 19b.

The third inlet-side switching valve 18c is a flow passage switching valve to connect the third inlet pipe 20c and a fourth inlet pipe 20d connected to the inlet side of the fourth device 11d alternatively to the cold water supply channel 16. Further, the third outlet-side switching valve 19c is a flow passage switching valve to connect the third outlet pipe 21c and a fourth outlet pipe 21d connected to the outlet side of the fourth device 11d alternatively to the cold water suction port 13a of the cold water pump 13.

Cold water or warm water flowing from the third inlet pipe 20c into the third device 11c flows toward the third outlet pipe 21c after the heat is exchanged inside the third device 11c. That is, when cold water flows in the third device 11c, the third device 11c is cooled by the cold water and, when warm water flows in the third device 11c, the third device 11c is heated by the warm water.

Further, cold water flowing from the fourth inlet pipe 20d into the fourth device 11d flows out toward the fourth outlet pipe 21d after the heat is exchanged inside the fourth device 11d. That is, when cold water flows in the fourth device 11d, the fourth device 11d is cooled by the cold water.

The third inlet-side switching valve 18c and the third outlet-side switching valve 19c operate in conjunction with each other. In detail, when the third inlet-side switching valve 18c connects the third inlet pipe 20c to the cold water supply channel 16, the third outlet-side switching valve 19c connects the third outlet pipe 21c to the cold water suction port 13a of the cold water pump 13. On this occasion, the port of the third inlet-side switching valve 18c connected to the fourth inlet pipe 20d is closed by the third inlet-side switching valve 18c and the port of the third outlet-side switching valve 19c connected to the fourth outlet pipe 21d is closed by the third outlet-side switching valve 19c.

Inversely, when the third inlet-side switching valve 18c connects the fourth inlet pipe 20d to the cold water supply channel 16, the third outlet-side switching valve 19c connects the fourth outlet pipe 21d to the cold water suction port 13a of the cold water pump 13. On this occasion, the port of the third inlet-side switching valve 18c connected to the third inlet pipe 20c is closed by the third inlet-side switching valve 18c and the port of the third outlet-side switching valve 19c connected to the third outlet pipe 21c is closed by the third outlet-side switching valve 19c.

Further, the second and third inlet-side switching valves 18b and 18c and the second and third outlet-side switching valves 19b and 19c are controlled in conjunction with each other so as not to allow both cold water and warm water but to allow either cold water or warm water to flow into the third device 11c.

That is, when the second inlet-side switching valve 18b connects the third inlet pipe 20c to the warm water supply channel 17 and the second outlet-side switching valve 19b connects the third outlet pipe 21c to the warm water suction port 14a of the warm water pump 14, the third inlet-side switching valve 18c connects the fourth inlet pipe 20d to the cold water supply channel 16 and the third outlet-side switching valve 19c connects the fourth outlet pipe 21d to the cold water suction port 13a of the cold water pump 13.

Inversely, when the third inlet-side switching valve 18c connects the third inlet pipe 20c to the cold water supply channel 16 and the third outlet-side switching valve 19c connects the third outlet pipe 21c to the cold water suction port 13a of the cold water pump 13, the second inlet-side switching valve 18b connects the second inlet pipe 20b to the warm water supply channel 17 and the second outlet-side switching valve 19b connects the second outlet pipe 21b to the warm water suction port 14a of the warm water pump 14.

In the heat management system 10 in this way, cold water discharged from the cold water pump 13 and warm water discharged from the warm water pump 14 circulate through respective heat medium circuits that never merge with each other by controlling the switching valves 18a, 18b, 18c, 19a, 19b, and 19c.

Figure 2:
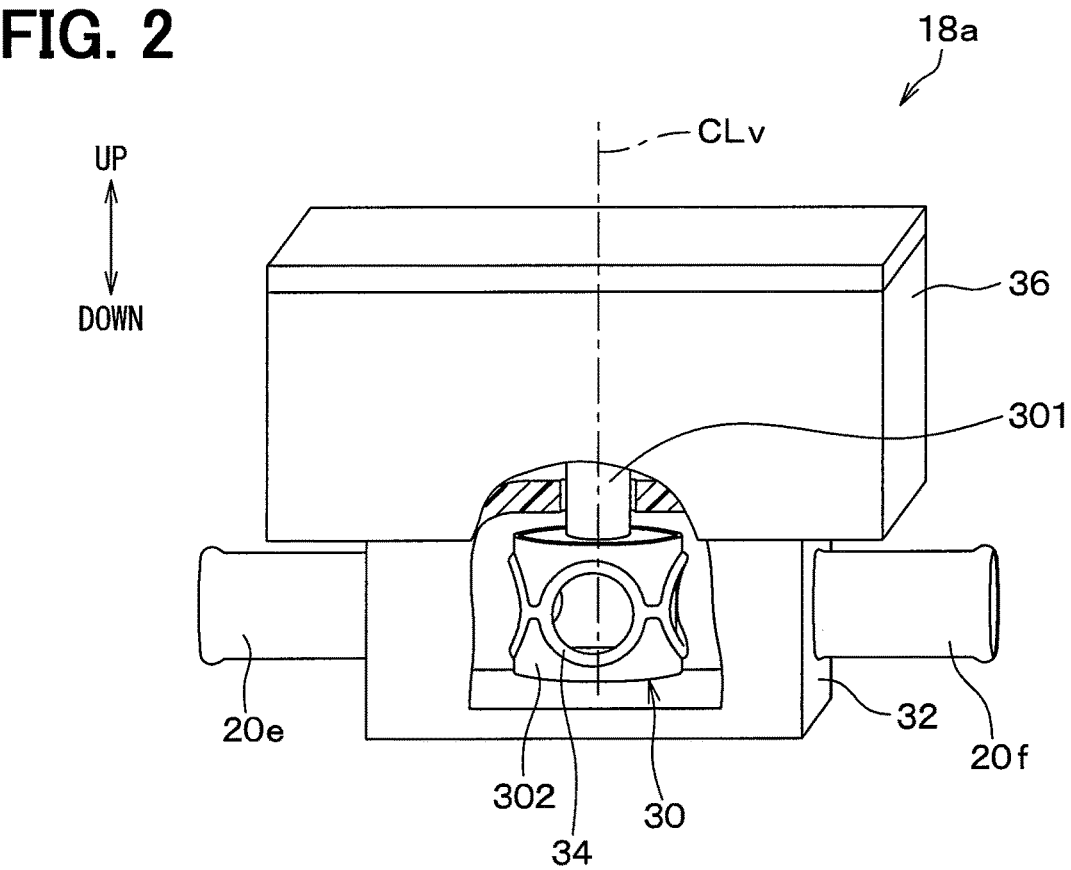
FIG. 2 is a perspective view of the flow passage switching valve according to the first embodiment and shows a valve main body and a sealing member by virtually cutting away the valve main body around a valve body.

The structure of the switching valves 18a, 18b, 18c, 19a, 19b, and 19c according to the present embodiment is explained hereunder. The first inlet-side switching valve 18a is shown in FIG. 2 and is explained hereunder because the other switching valves 18b, 18c, 19a, 19b, and 19c have structures similar to the first inlet-side switching valve 18a. Thus the explanations on the other switching valves 18b, 18c, 19a, 19b, and 19c are omitted. Further, the first inlet-side switching valve 18a is merely called a flow passage switching valve 18a in the following explanations.

As shown in FIG. 2, the flow passage switching valve 18a is a rotary flow passage switching valve and has a rotating part 30, a valve main body 32 that is a non-rotating part, a sealing member 34, and a valve driving part 36.

The valve driving part 36 is a driving source to rotate the rotating part 30 in accordance with the electrical control of an electronic control unit not shown in the figure and is arranged above the valve main body 32. The valve driving part 36 includes a deceleration mechanism such as a gear train and an electric motor for example.

Figure 3:
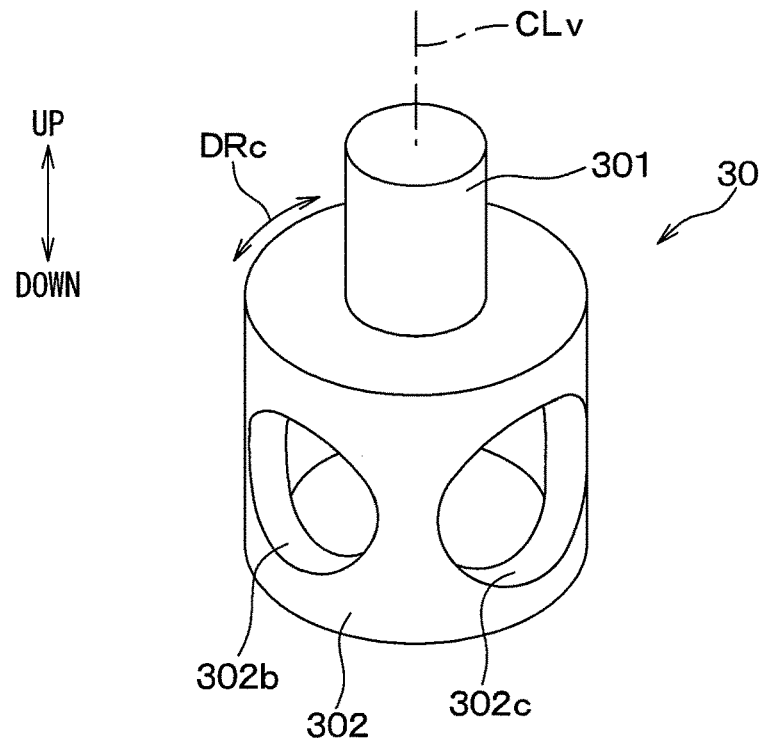
FIG. 3 is a schematic perspective view showing a rotating part alone in FIG. 2 according to the first embodiment.

The rotating part 30 alone: is schematically shown in FIG. 3; and, as shown in FIGS. 2 and 3, has a rotating part axis 301 and a valve body 302, those being formed integrally. The rotating part axis 301 is shaped cylindrically around a valve axis CLv and protrudes from the valve body 302 toward the side of the valve driving part 36. Then the rotating part axis 301 is connected to the valve driving part 36 so as to be able to transmit power. In the present embodiment here, the valve axis CLv constitutes an axis center extending in the vertical direction. Further, the rotating part 30 comprises a resin for example.

Figure 4:
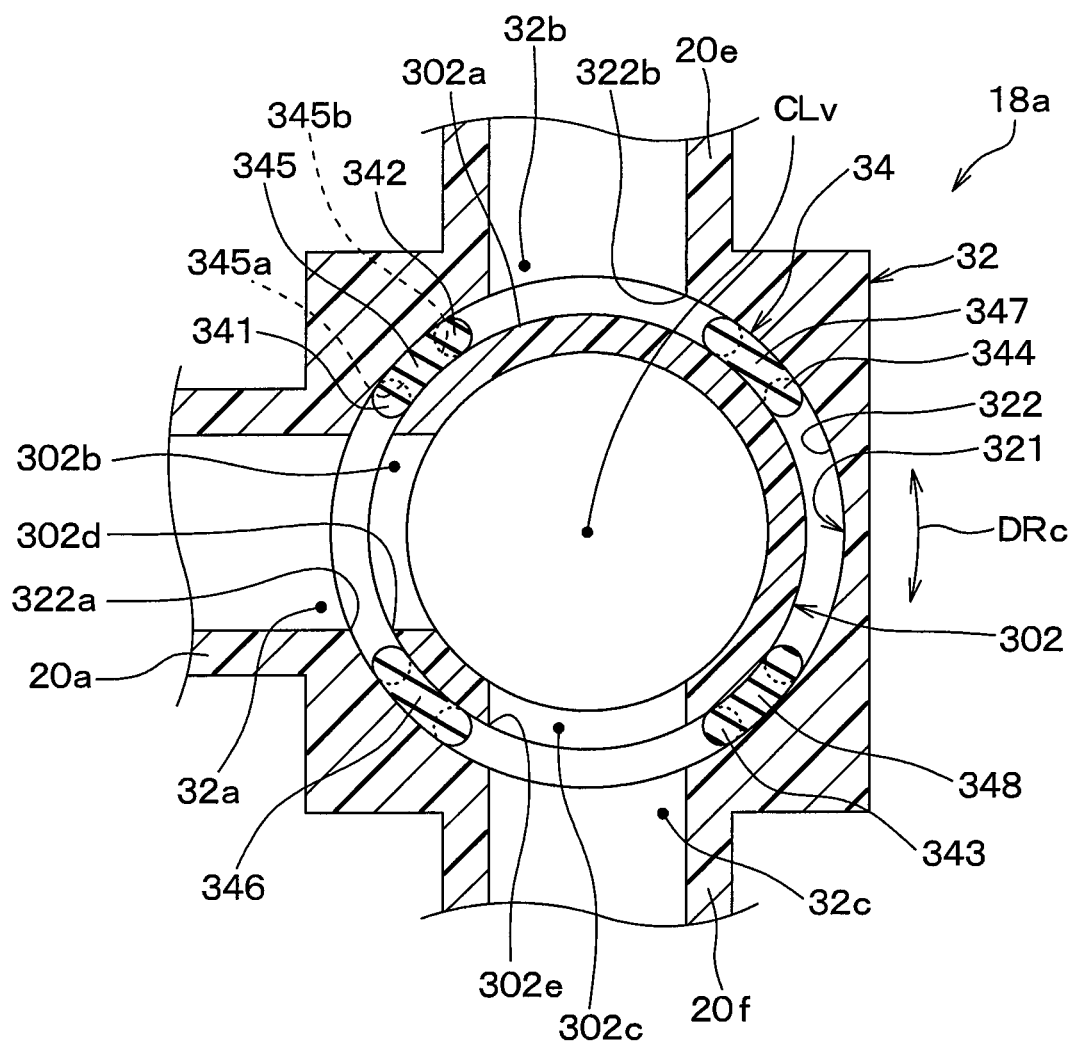
FIG. 4 is a sectional view of the flow passage switching valve according to the first embodiment taken on a virtual cross section perpendicular to a valve axis and viewed from the above and shows the state of connecting a first opening hole and a third opening hole to each other through a valve body and closing the second opening hole with the valve body.

As shown in FIGS. 3 and 4, the valve body 302 rotates integrally with the rotating part axis 301 around the valve axis CLv by transferring a rotational driving force from the valve driving part 36. For example, the valve body 302 rotates both clockwise and counterclockwise in FIG. 4. The external shape of the valve body 302 taken on a virtual section perpendicular to the valve axis CLv has a round shape formed around the valve axis CLv.

Further, the valve body 302 has a valve body outer peripheral surface 302a as an outer peripheral surface of the valve body 302. The valve body outer peripheral surface 302a faces outward in a valve radial direction DRr and extends in the manner of surrounding the valve axis CLv. Here, the valve radial direction DRr is a direction extending radially from the valve axis CLv.

Furthermore, two valve body openings 302b and 302c opening outward in the valve radial direction DRr are formed in the valve body 302. Each of the two valve body openings 302b and 302c is a round opening. Then the two valve body openings 302b and 302c communicate with each other inside the valve body 302. That is, a first valve body opening 302b that is one of the two valve body openings 302b and 302c constitutes one end of a valve body flow passage that is formed in the valve body 302 and allows a fluid to flow and a second valve body opening 302c that is the other opening constitutes the other end of the valve body flow passage.

Moreover, the first valve body opening 302b is: arranged side by side with the second valve body opening 302c in a valve circumferential direction DRc; and directed in a direction perpendicular to the direction of the second valve body opening 302c around the valve axis CLv. Here, the valve circumferential direction DRc is a direction extending circumferentially around the valve axis CLv.

As shown in FIGS. 2 and 4, the valve main body 32 comprises a resin for example and a valve chamber 321 is formed in the valve main body 32. The valve body 302 and the sealing member 34 are accommodated in the valve chamber 321. Further, the valve main body 32 has a main body inner peripheral surface 322 inside the valve main body 32.

The main body inner peripheral surface 322 of the valve main body 32 forms the valve chamber 321. In detail, the main body inner peripheral surface 322 faces the valve body outer peripheral surface 302a in the valve chamber 321.

Further, three opening holes 32a, 32b, and 32c each penetrating from the valve chamber 321 in the valve radial direction DRr are formed in the valve main body 32. Each of the three opening holes 32a, 32b, and 32c is a hole having a round shape on a section perpendicular to the axial direction of the hole.

A first opening hole 32a in the three opening holes 32a, 32b, and 32c is connected to the first inlet pipe 20a (refer to FIG. 1). Further, a second opening hole 32b is connected to a pipe 20e (refer to FIG. 1) constituting a part of the cold water supply channel 16 and a third opening hole 32c is connected to a pipe 20f (refer to FIG. 1) constituting a part of the warm water supply channel 17.

Further, the second opening hole 32b and the third opening hole 32c are: arranged side by side with the first opening hole 32a in the valve circumferential direction DRc; and directed in the directions perpendicular to the direction of the first opening hole 32a respectively. Here, the second opening hole 32b is arranged on the side of the first opening hole 32a opposite to the third opening hole 32c in the valve circumferential direction DRc.

The first valve body opening 302b of the rotating part 30 faces and communicates with one of the first opening hole 32a and the second opening hole 32b of the valve main body 32 in accordance with a rotation position of the valve body 302. In contrast, the second valve body opening 302c faces and communicates with one of the first opening hole 32a and the third opening hole 32c in accordance with a rotation position of the valve body 302.

Specifically, the valve body 302 is positioned at least at one of a first valve body position that is the rotation position in FIG. 4 and a second valve body position that is a rotation position rotated clockwise by an angle of 90° from the rotation position in FIG. 4 by the drive of the valve driving part 36. Then when the valve body 302 is located at the first valve body position, the first valve body opening 302b faces and communicates with the first opening hole 32a and the second valve body opening 302c faces and communicates with the third opening hole 32c. Further, when the valve body 302 is located at the second valve body position, the first valve body opening 302b faces and communicates with the second opening hole 32b and the second valve body opening 302c faces and communicates with the first opening hole 32a.

The sealing member 34 comprises a resilient body such as rubber having a resiliency for example. As shown in FIGS. 2 and 4, the sealing member 34 is: arranged in the valve chamber 321 outside the valve body 302 in the valve radial direction DRr; and formed so as to circularly surround the valve body 302. For example, as shown in the perspective view of FIG. 5, the sealing member 34 surrounds the valve body 302.

Further, as shown in FIG. 4, the sealing member 34 is interposed between the valve body outer peripheral surface 302a and the main body inner peripheral surface 322 in the valve radial direction DRr.

Figure 6:
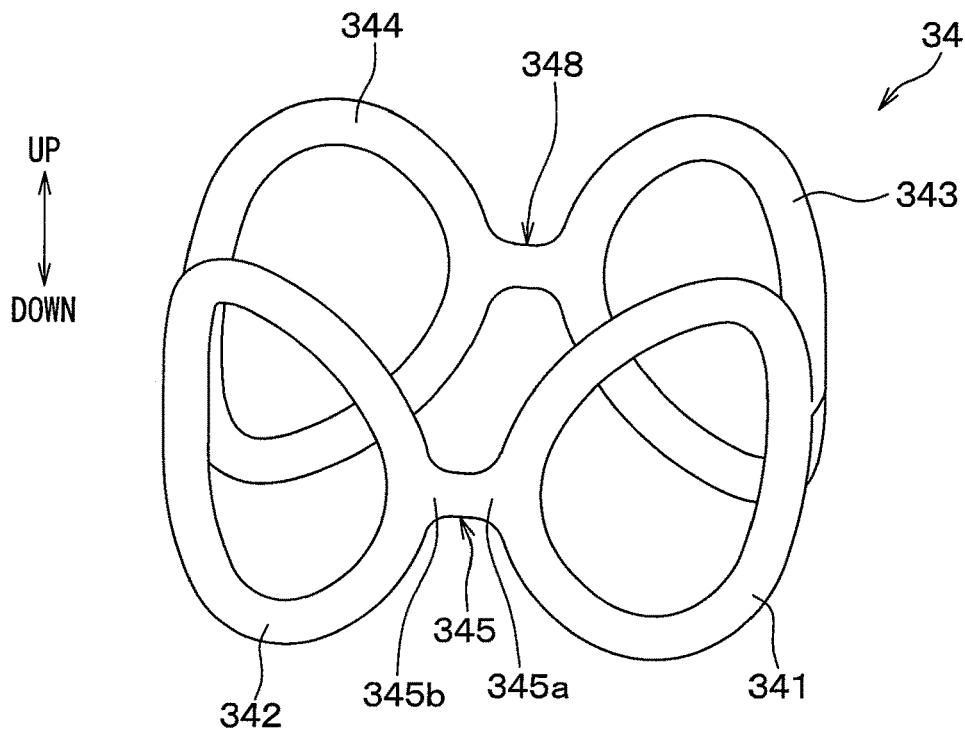
FIG. 6 is a schematic perspective view showing a sealing member alone in a free state according to the first embodiment.

The sealing member 34 alone is schematically shown in FIG. 6. As shown in FIGS. 6 and 4, the sealing member 34 has a first sealing part 341, a second sealing part 342, a third sealing part 343, a fourth sealing part 344, a first joining part 345, a second joining part 346, a third joining part 347, and a fourth joining part 348.

The first joining part 345 connects the first sealing part 341 and the second sealing part 342 and the second joining part 346 connects the first sealing part 341 and the third sealing part 343. Then the third joining part 347 connects the second sealing part 342 and the fourth sealing part 344 and the fourth joining part 348 connects the third sealing part 343 and the fourth sealing part 344. Here, when the four sealing parts 341, 342, 343, and 344 are described collectively, they are described as the sealing parts 341 to 344. Further, when the four joining parts 345, 346, 347, and 348 are described collectively, they are described as the joining parts 345 to 348.

Then a region of the sealing member 34 in contact with the valve body outer peripheral surface 302a and the main body inner peripheral surface 322 is pressed by both the surfaces 302a and 322. For example, a part of the sealing member 34 overlaps with one of the valve body openings 302b and 302c and does not come into contact with the valve body outer peripheral surface 302a at a certain rotation position of the valve body 302 but the whole sealing member 34 is pressed by both the surfaces 302a and 322 in FIG. 4.

That is, all of the four sealing parts 341 to 344 and the four joining parts 345 to 348 are clamped between the valve body outer peripheral surface 302a and the main body inner peripheral surface 322, respectively. On this occasion, all of the four sealing parts 341 to 344 and the four joining parts 345 to 348 are deformed resiliently by being compressed in the valve radial direction DRr by the valve body outer peripheral surface 302a and the main body inner peripheral surface 322.

Figure 7:
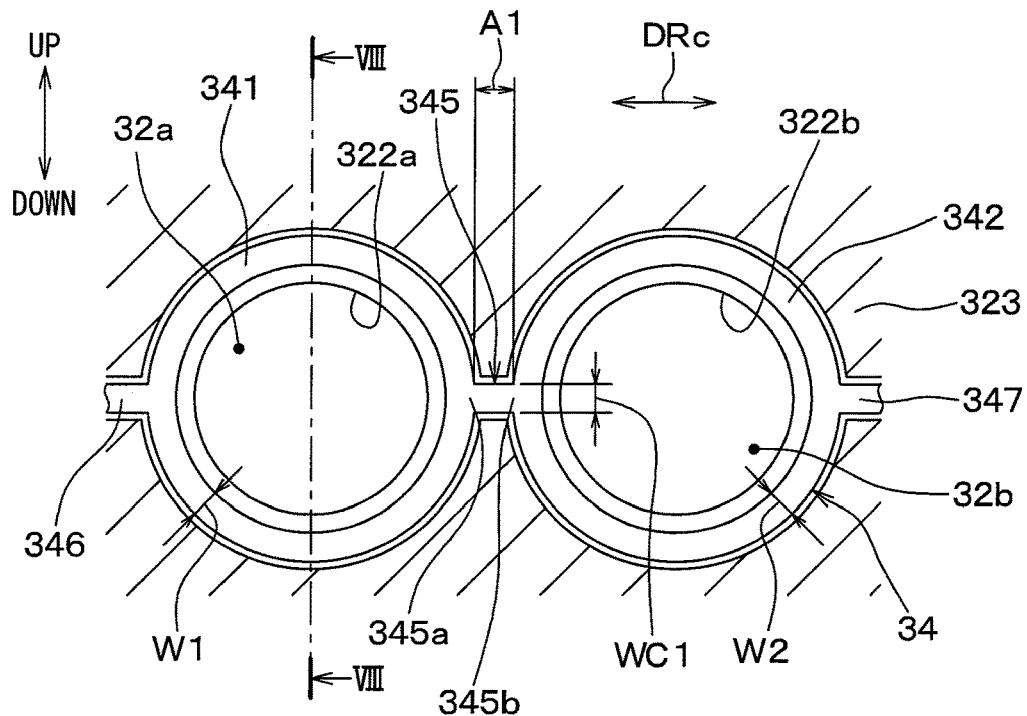
FIG. 7 is a development elevation obtained by, in FIG. 4 according to the first embodiment, developing a view of a sealing member viewed from the center of a valve chamber outward in a valve radial direction by regarding the valve circumferential direction as a paper horizontal direction, excluding a valve body from the figure, and excerpting first and second sealing parts and their vicinities.

As shown in FIGS. 4 and 7, the four sealing parts 341, 342, 343, and 344 of the sealing member 34 have annular shapes identical to each other, respectively.

In detail, the first sealing part 341 is formed annularly so as to have a predetermined sealing width W1 in a radial direction of the first opening hole 32a (namely in a hole radial direction) and extend around the first opening hole 32a. That is, the first sealing part 341 extends so as to surround a peripheral edge 322a of the first opening hole 32a on the side of the main body inner peripheral surface 322. Then, when one valve body opening of the first valve body opening 302b and the second valve body opening 302c faces and communicates with the first opening hole 32a, the first sealing part 341 prevents a fluid (for example, cold water or warm water) flowing between the one valve body opening and the first opening hole 32a from leaking.

Further, the second sealing part 342 is formed annularly so as to have a predetermined sealing width W2 in a radial direction of the second opening hole 32b and extend around the second opening hole 32b. That is, the second sealing part 342 extends so as to surround a peripheral edge 322b of the second opening hole 32b on the side of the main body inner peripheral surface 322. Then, when the first valve body opening 302b faces and communicates with the second opening hole 32b, the second sealing part 342 prevents a fluid flowing between the first valve body opening 302b and the second opening hole 32b from leaking.

Here, the third and fourth sealing parts 343 and 344 are also similar to the first and second sealing parts 341 and 342 stated above and for example the sealing widths of the sealing parts 341, 342, 343, and 344 are identical to each other. Since the fourth sealing part 344 is formed in order to share the sealing member 34 between a three-way valve and a four-way valve however, an opening hole corresponding to the fourth sealing part 344 is not formed in the valve main body 32 in the case of the flow passage switching valve 18a that is a three-way valve according to the present embodiment.

The first joining part 345 is formed so that the width WC1 of the first joining part 345 in a direction parallel with the valve axis CLv may be equal to the sealing width W1 of the first sealing part 341. For example, all of the widths of the joining parts 345 to 348 and the sealing widths of the sealing parts 341 to 344 are equal to each other.

The first joining part 345 has a first joining end portion 345a connected to the first sealing part 341 and a second joining end portion 345b connected to the second sealing part 342. In detail, the first joining end portion 345a is connected to a portion of the first sealing part 341 most projecting toward the side of the first joining part 345 in the valve circumferential direction DRc. On the other hand, the second joining end portion 345b is connected to a portion of the second sealing part 342 most projecting toward the side of the first joining part 345 in the valve circumferential direction DRc. That is, the first joining part 345 is arranged at a portion where a mutual interval A1 between the first sealing part 341 and the second sealing part 342 is smallest in the valve circumferential direction DRc.

Further, when attention is paid to the relationship between the joining end portions 345a and 345b and the valve body 302, at least the joining end portions 345a and 345b of the first joining part 345 are deformed resiliently by being pressed by the valve body outer peripheral surface 302a outward in the valve radial direction DRr, respectively. Here, the second to fourth joining parts 346, 347, and 348 are also similar to the first joining part 345 respectively and hence the explanations on them are omitted.

Figure 8:
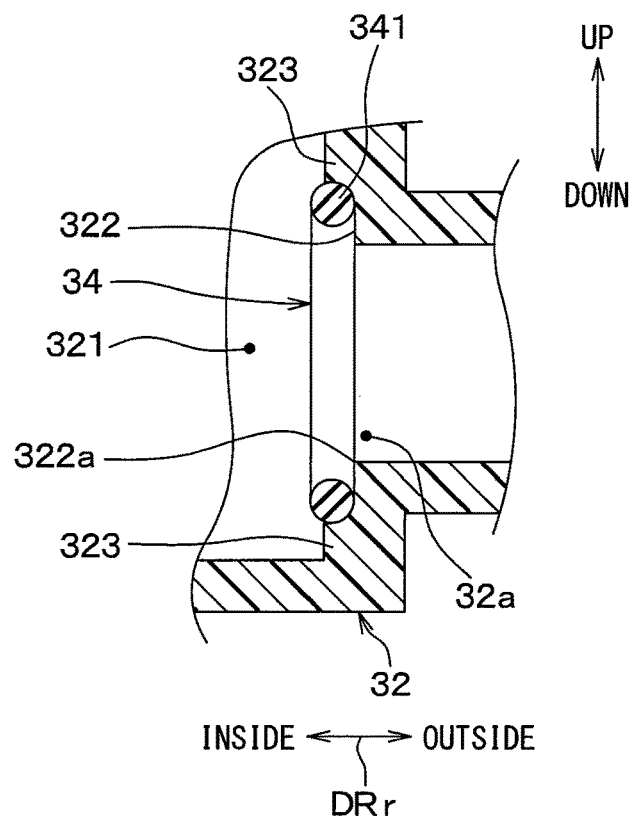
FIG. 8 is a sectional view taken on line VIII-VIII in FIG. 7 with a valve body excluded from the figure.

Further, the sealing member 34 is locked inside the valve main body 32 so as not to rotate by being dragged in the rotation of the valve body 302. As shown in FIGS. 7 and 8 for example, the valve main body 32 has a protrusion 323 protruding inward in the valve radial direction DRr in the valve chamber 321. The protrusion 323 protrudes in the region of the main body inner peripheral surface 322 around the sealing member 34. As a result, the sealing member 34 is locked by the protrusion 323 in the valve circumferential direction DRc and is incapable of rotating relatively to the valve main body 32. Here, in order to make FIGS. 7 and 8 more visible, the protrusion 323 of the valve main body 32 is hatched in FIG. 7 and the rotating part 30 is omitted in FIG. 8.

Figure 9:
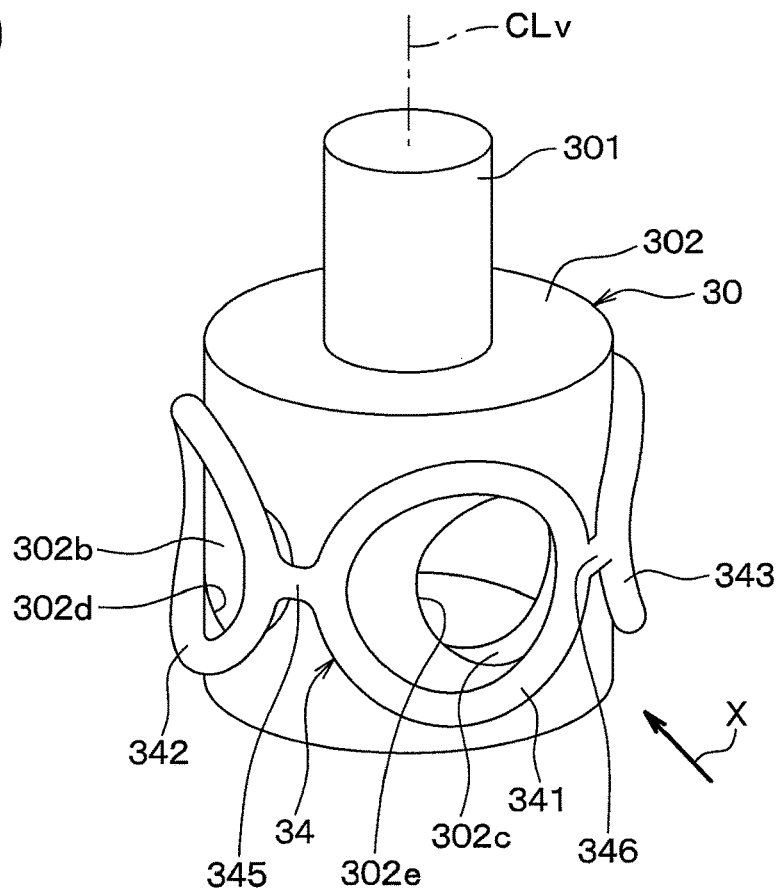
FIG. 9 is a perspective view corresponding to FIG. 5 extractively showing a valve body and a sealing member according to the first embodiment in the middle of rotating the valve body from a first valve body position to a second valve body position.
Figure 10:
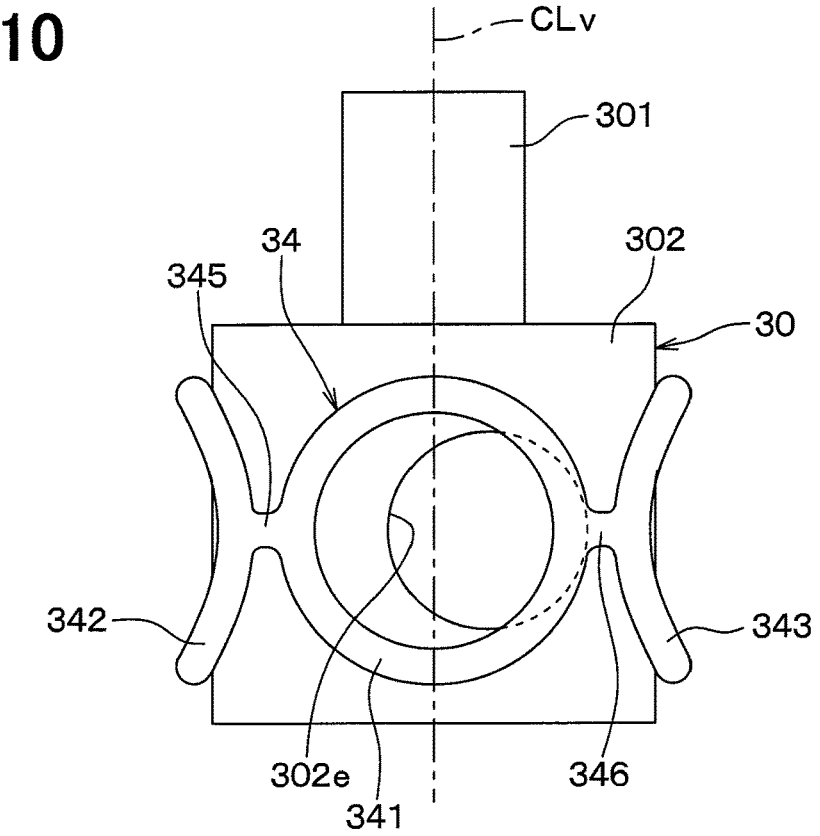
FIG. 10 is a view taken in the direction of the arrow X in FIG. 9.

Further, in the control of the flow passage switching valve 18a by the electronic control unit, the rotating part 30 is rotated so that the valve body 302 may not stop at an intermediate position between the first valve body position and the second valve body position, for example at an intermediate position shown in FIGS. 9 and 10. In short, when the valve body 302 rotates, the valve body 302 stops at the first valve body position or the second valve body position but does not stop at an intermediate position other than the positions. The purpose is to keep the sealing performance of the sealing member 34 good.

That is, when the rotational motion of the valve body 302 stops, the valve body 302 stops at a rotation position where a peripheral edge 302d of the first valve body opening 302b and a peripheral edge 302e of the second valve body opening 302c overlap with none of the first to third sealing parts 341, 342, and 343. In other words, the valve body 302 stops at a rotation position where the peripheral edges 302d and 302e of both the valve body openings 302b and 302c formed on the valve body outer peripheral surface 302a overlap with none of the first to third sealing parts 341, 342, and 343.

At an intermediate position shown in FIGS. 9 and 10 for example, the peripheral edge 302d of the first valve body opening 302b overlaps partially with the second sealing part 342 and the peripheral edge 302e of the second valve body opening 302c overlaps partially with the first sealing part 341. At the intermediate position shown in FIGS. 9 and 10 therefore, the rotation of the valve body 302 does not stop.

Figure 5:
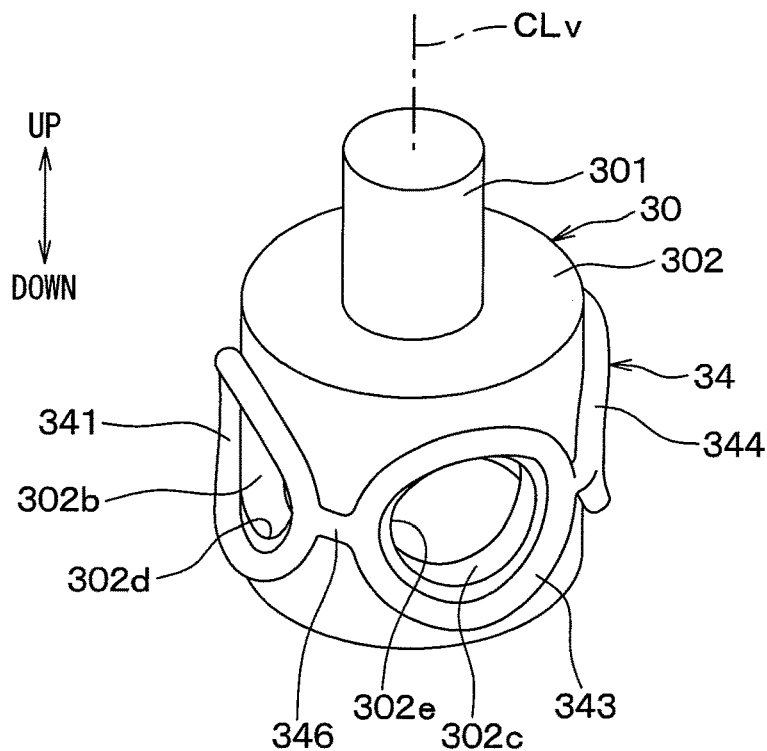
FIG. 5 is a perspective view extractively showing a valve body and a sealing member in the state of locating the valve body at a first valve body position according to the first embodiment.

On the other hand, at the first valve body position shown in FIG. 5, the whole first valve body opening 302b is located inside the annular first sealing part 341 and the whole second valve body opening 302c is located inside the annular third sealing part 343. Neither of the peripheral edges 302d and 302e of both the valve body openings 302b and 302c therefore overlaps with the first to third sealing parts 341, 342, and 343. Further, same applies to the second valve body position. The valve body 302 therefore stops at the first valve body position or the second valve body position.

Meanwhile, the valve body 302 may also stop at a rotation position where the peripheral edge 302d of the first valve body opening 302b or the peripheral edge 302e of the second valve body opening 302c overlaps with the fourth sealing part 344. This is because an opening hole corresponding to the fourth sealing part 344 is not formed in the valve main body 32 and the permanent deformation of the fourth sealing part 344 does not affect the sealing performance of the sealing member 34 even when the fourth sealing part 344 is deformed permanently by the valve body 302.

Figure 11:
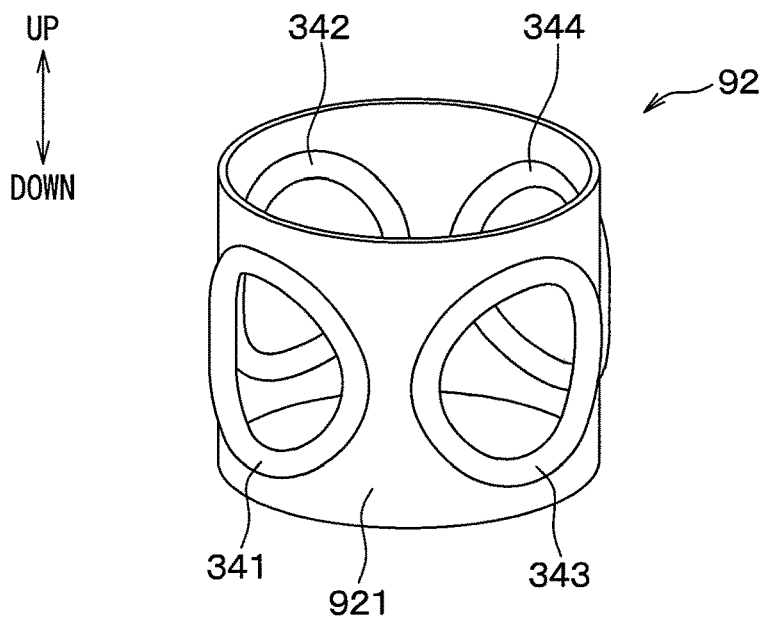
FIG. 11 is a schematic perspective view showing a sealing member constituting a flow passage switching valve according to a comparative example alone in a free state and corresponding to FIG. 6 according to the first embodiment.
Figure 12:
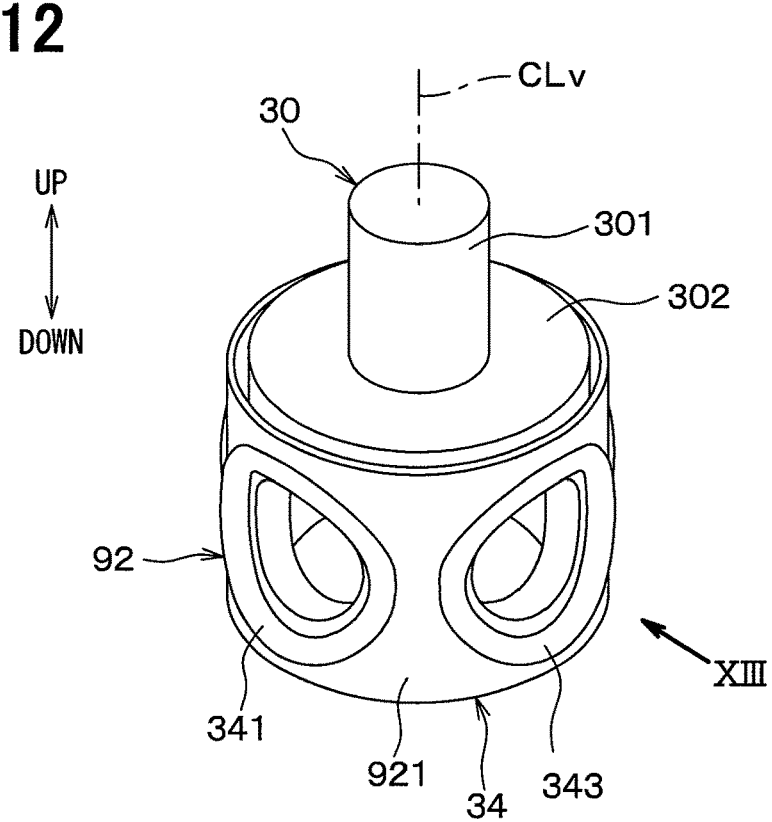
FIG. 12 is a perspective view extractively showing a valve body and a sealing member according to the comparative example and corresponding to FIG. 5 according to the first embodiment.
Figure 13:
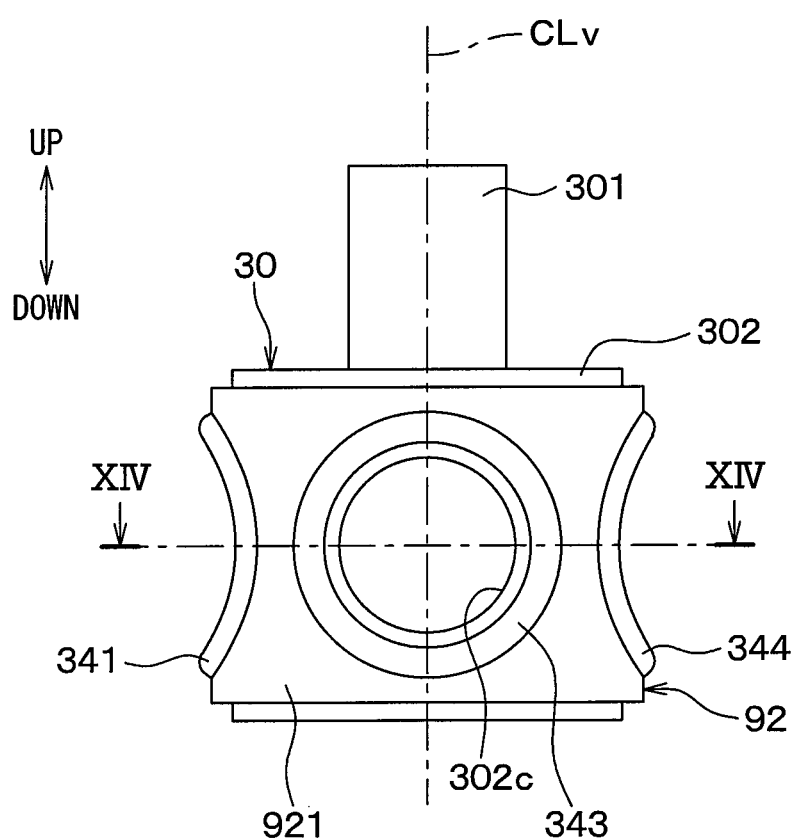
FIG. 13 is a view taken in the direction of the arrow XIII in FIG. 12.

A flow passage switching valve 90 according to a comparative example that is compared with the present embodiment is explained hereunder. The flow passage switching valve 90 according to the comparative example (refer to FIG. 17) is a valve formed by replacing the sealing member 34 in the flow passage switching valve 18a according to the present embodiment with a sealing member 92 shown in FIG. 11. The sealing member 92 according to the comparative example is similar to the sealing member in Patent Document 1. That is, the sealing member 92 according to the comparative example has four sealing parts 341 to 344 and a cylindrical connecting wall 921 to connect the sealing parts. The sealing member 92 is formed so as to circularly surround a valve body 302 in a valve chamber 321 as shown in FIGS. 12 to 14 similarly to the sealing member 34 according to the present embodiment.

Figure 14:
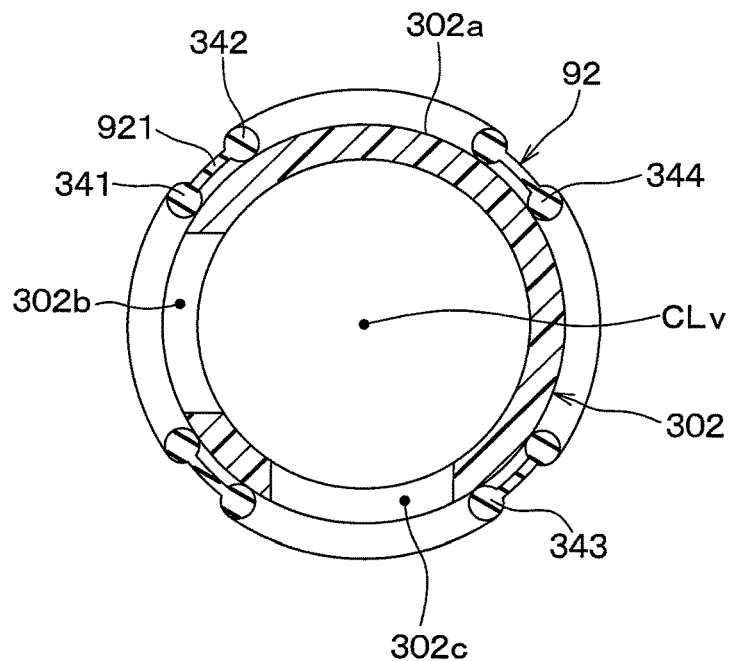
FIG. 14 is a sectional view being taken on line XIV-XIV in FIG. 13 and extractively showing a valve body and a sealing member.
Figure 15:
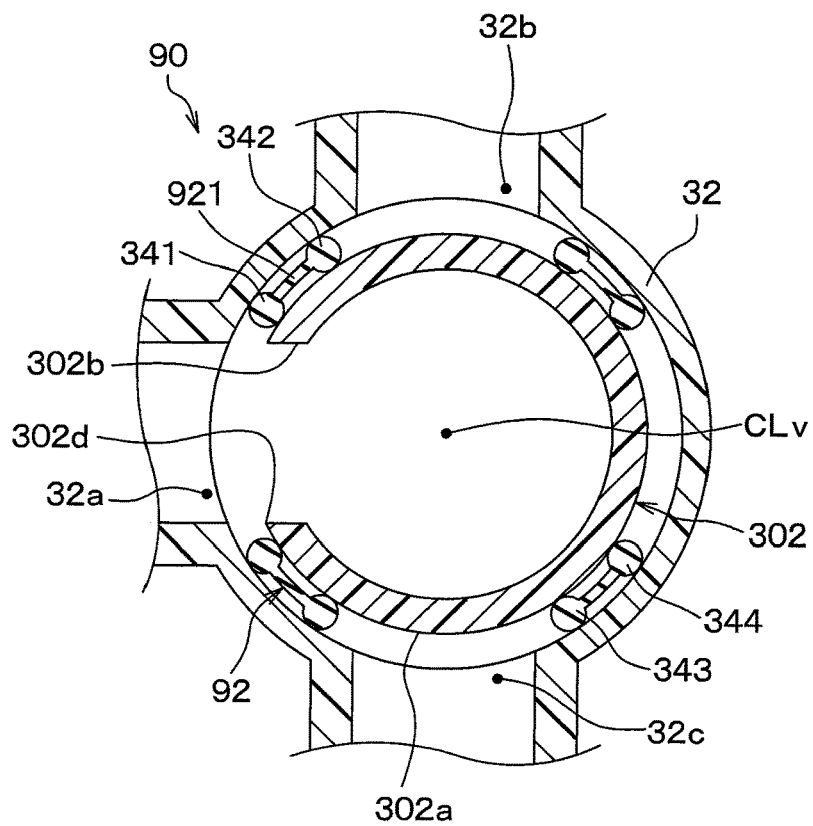
FIG. 15 is a sectional view of a flow passage switching valve according to the comparative example taken on the same cross section as FIG. 4 in the case of locating a valve body at a first valve body position.

Further, as shown in FIGS. 14 and 15, the thickness of the connecting wall 921 is smaller than the sealing parts 341 to 344 in the valve radial direction DRr and hence the sealing parts 341 to 344 protrude from the connecting wall 921 inward in the valve radial direction DRr. Steps therefore are formed between the sealing parts 341 to 344 and the connecting wall 921 in the valve radial direction DRr and a radial direction gap is formed between the connecting wall 921 and the valve body 302. That is, the connecting wall 921 is not deformed resiliently by a valve body outer peripheral surface 302a.

Figure 16:
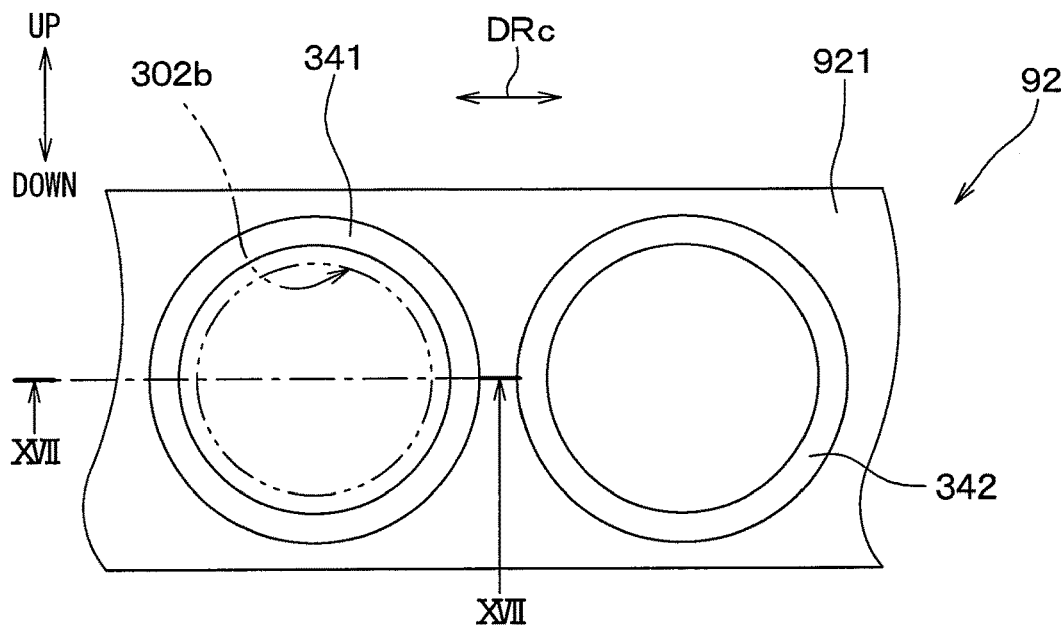
FIG. 16 is a development elevation obtained by, in FIG. 15 according to the comparative example, developing a view of a sealing member viewed from the center of a valve chamber outward in a valve radial direction by regarding the valve circumferential direction as a paper horizontal direction, showing the sealing member alone, and showing a positional relationship between a first valve body opening and the sealing member in FIG. 15.
Figure 17:
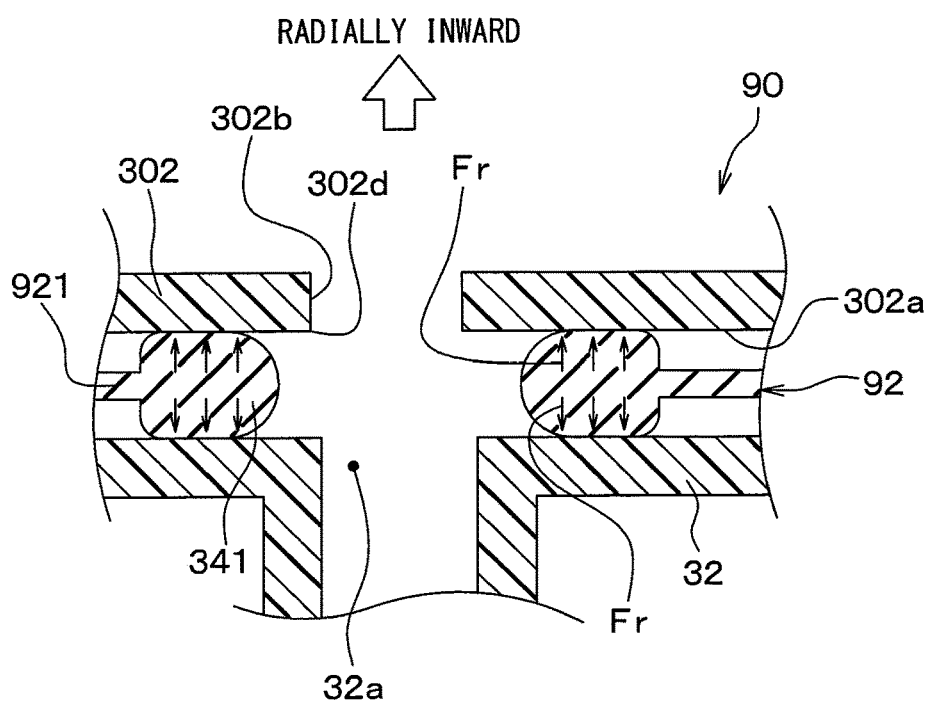
FIG. 17 is a sectional view of a flow passage switching valve taken on line XVII-XVII in FIG. 16 according to the comparative example.

In the flow passage switching valve 90 according to the comparative example, when the valve body 302 is located at a first valve body position where a first valve body opening 302b faces and communicates with a first opening hole 32a for example as shown in FIGS. 15 to 17, all the sealing parts 341 to 344 are in contact with the valve body outer peripheral surface 302a. The main cause of rotational resistance against the rotation of the valve body 302 therefore is a frictional force caused by the repulsive force Fr of the compressed sealing parts 341 to 344. The frictional force generating a sliding resistance of the valve body 302 causes the rotational resistance of the valve body 302 regularly when the valve body 302 rotates and does not cause the rotational resistance to increase temporarily. Here, a second valve body opening 302c is omitted in FIG. 15 and same applies also to FIG. 18 that will be described later.

Figure 18:
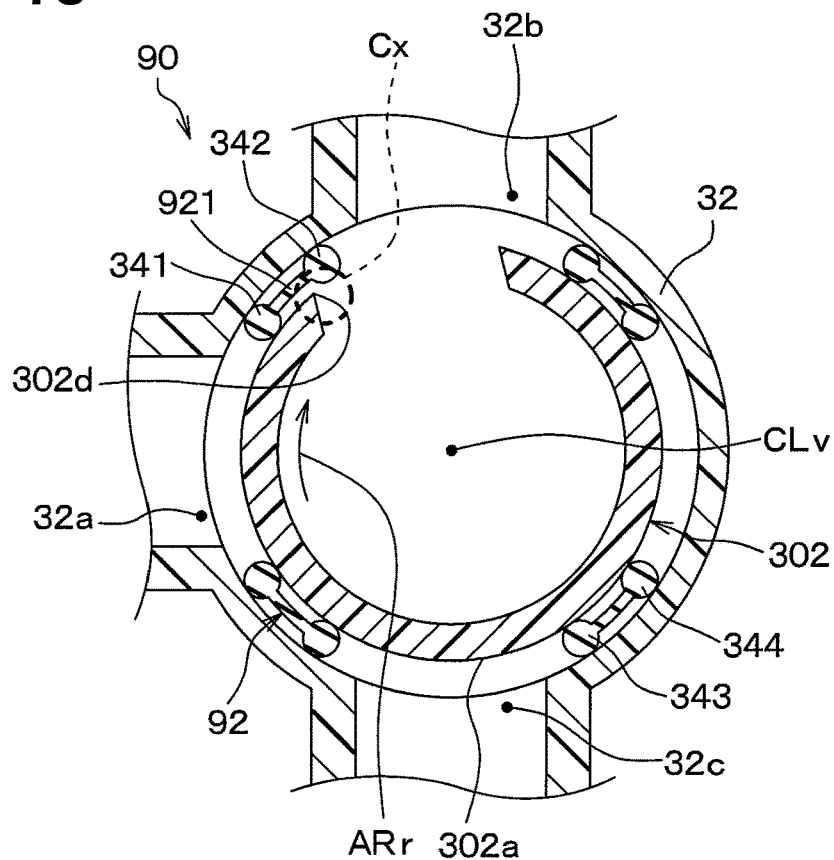
FIG. 18 is a sectional view of a flow passage switching valve according to the comparative example taken on the same cross section as FIG. 15 in the state of rotating a valve body from the rotation position in FIG. 15 and catching a second sealing member by the periphery of a first valve body opening.
Figure 19:
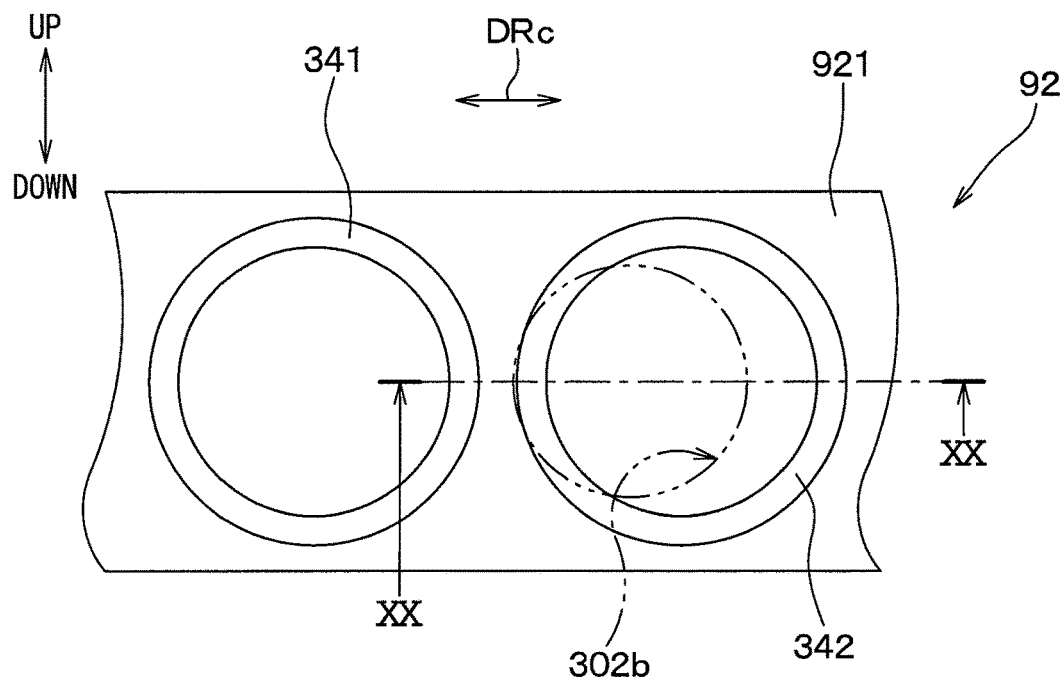
FIG. 19 is a development elevation showing a positional relationship between a first valve body opening and a sealing member in FIG. 18 similarly to FIG. 16.
Figure 20:
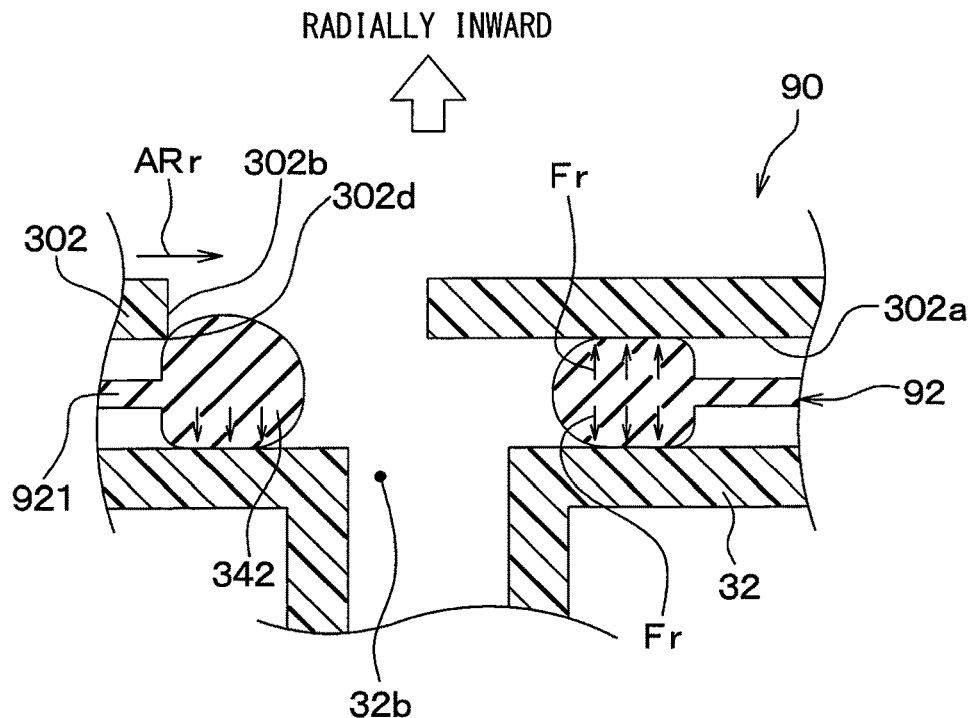
FIG. 20 is a sectional view of a flow passage switching valve according to the comparative example taken on line XX-XX in FIG. 19 corresponding to FIG. 17.

In contrast, in the flow passage switching valve 90 according to the comparative example, when the valve body 302 rotates as indicated by the arrow ARr in FIG. 18 from the first valve body position shown in FIGS. 15 to 17, the sealing member 92 comes to be in the state shown in FIGS. 18 to 20 immediately before the first valve body opening 302b faces a second opening hole 32b. That is, the sealing member 92 comes to be in the state of overlapping the second sealing part 342 with a peripheral edge 302d of the first valve body opening 302b.

If so, the second sealing part 342 is released from the pressed state of being pressed by the valve body outer peripheral surface 302a and gets slightly into the first valve body opening 302b. When the valve body 302 rotates further from the state, the second sealing part 342 of the sealing member 92 returns to the above pressed state from the released state of getting slightly into the first valve body opening 302b.

Figure 21:
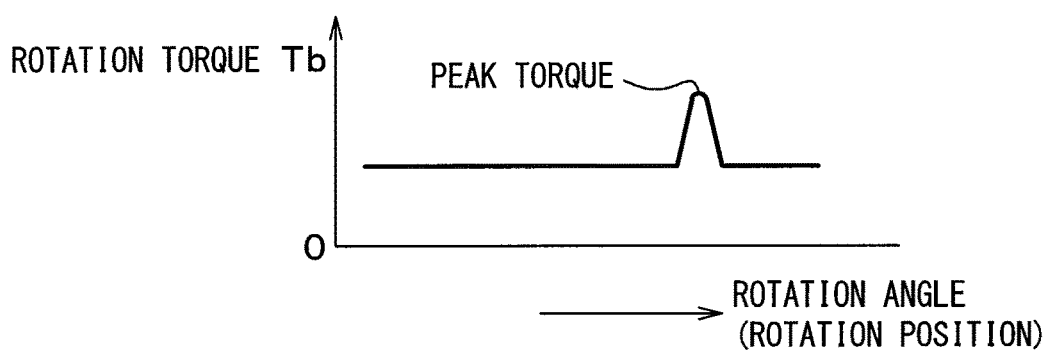
FIG. 21 is a view showing a relationship between a rotation angle (namely, rotation position) of a valve body on the horizontal axis and a rotation torque Tb for rotating the valve body on the vertical axis in a flow passage switching valve according to the comparative example.

On this occasion, the second sealing part 342 is caught by the peripheral edge 302d of the first valve body opening 302b as shown in FIG. 20 and hinders the rotation of the valve body 302 at the part Cx in FIG. 18. That is, during the course of rotating the valve body 302, when the second sealing part 342 of the sealing member 92 returns from the above released state to the pressed state, the valve body 302 is caught temporarily by the second sealing part 342. Because of this, a rotation torque Tb for rotating the valve body 302 increases temporarily as shown in FIG. 21 during the course of rotating the valve body 302. Moreover, when the sealing member 92 comprises rubber for example, the sealing member 92 hardens because of the deterioration of resiliency under a low temperature environment and increases the volume under a high temperature environment and hence the catch of the valve body 302 during the time of rotating the valve body 302 becomes conspicuous under either of the environments.

In the flow passage switching valve 18a according to the present embodiment, the sealing member 34 is configured so as to reduce a peak torque that is a maximum value of a temporarily increased rotation torque Tb.

That is, according to the present embodiment, the first joining part 345 is arranged at a portion where a mutual interval A1 between the first sealing part 341 and the second sealing part 342 is smallest in the valve circumferential direction DRc. Then at least the joining end portions 345a and 345b of the first joining part 345 are deformed resiliently by being pressed outward in the valve radial direction DRr by the valve body outer peripheral surface 302a, respectively. Moreover, the second to fourth joining parts 346, 347, and 348 are also similar to the first joining part 345, respectively.

The inward unevenness of the sealing member in the valve radial direction DRr therefore is inhibited and the sealing parts 341 to 344 are not easily caught by the peripheral edges 302d and 302e of the valve body openings 302b and 302c when the valve body 302 rotates.

Figure 22:
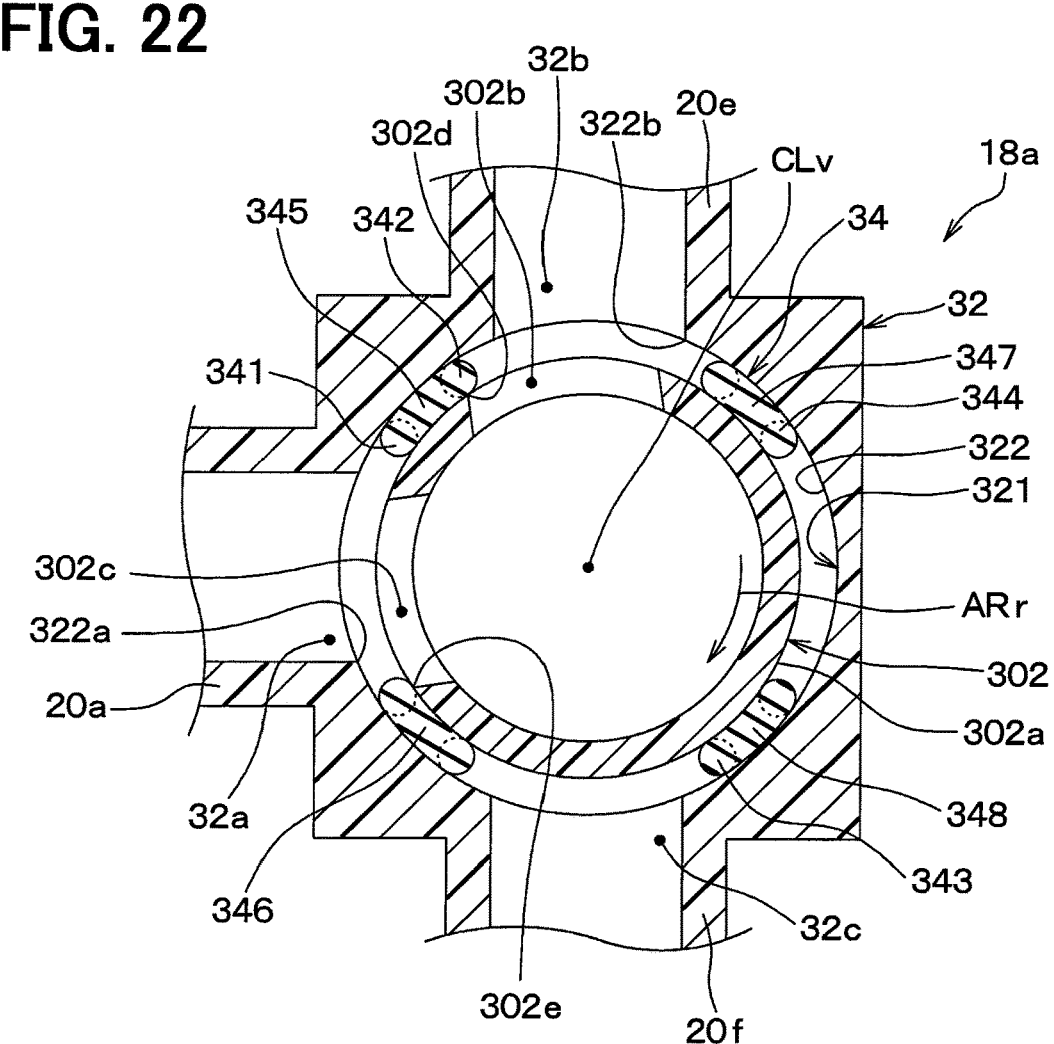
FIG. 22 is a sectional view of a flow passage switching valve according to the first embodiment taken on the same cross section as FIG. 4 in the middle of switching a valve body from a first valve body position to a second valve body position.

As shown in FIG. 22 for example, even when a part of the second sealing part 342 does not come into contact with the valve body outer peripheral surface 302a, the second sealing part 342 also deforms resiliently in accordance with the resilient deformation of the first joining part 345 pressed by the valve body outer peripheral surface 302a. As a result, when the valve body 302 rotates clockwise as shown by the arrow ARr in FIG. 22, the peripheral edge 302d of the first valve body opening 302b is not easily caught by the second sealing part 342.

Figure 23:
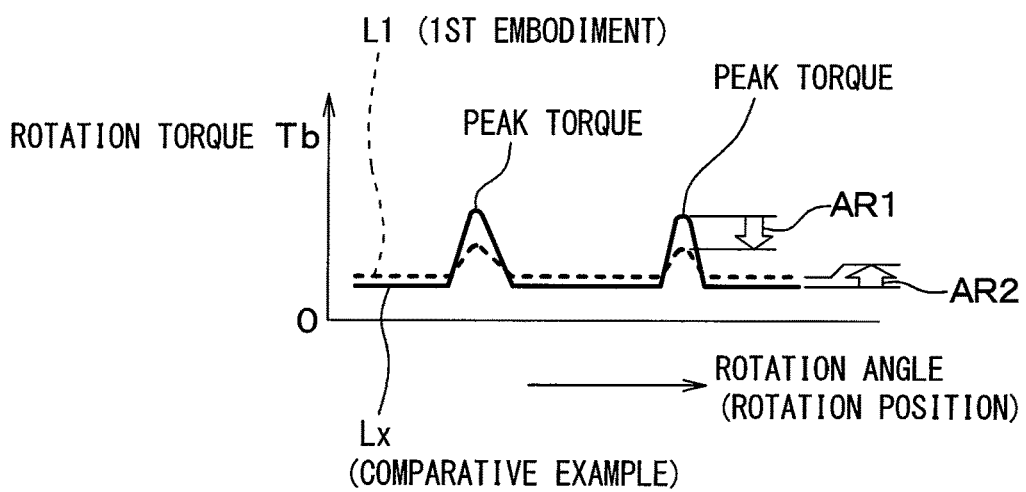
FIG. 23 is a view showing a relationship between a rotation angle (namely, rotation position) and a rotation torque Tb of a valve body in the same coordinate system as FIG. 21 in the manner of comparing the first embodiment and the comparative example.

In the present embodiment in this way, the maximum value of a rotation torque Tb for rotating the valve body 302 can be reduced as shown by the arrow AR1 in FIG. 23 in comparison with the comparative example shown in FIG. 18 and the like.

Here, in FIG. 23, the rotation torque Tb according to the present embodiment is represented by the broken line L1 and the rotation torque Tb of the comparative example is represented by the solid line Lx. Further, a torque during normal time of the rotation torque Tb in FIG. 23: is dominated by the compression ratio of the sealing member 34 that is a resilient body and the respective surface conditions of the sealing member 34 and the valve body outer peripheral surface 302a; and hence increases in comparison with the comparative example as shown by the arrow AR2. This is because the four joining parts 345 to 348 are compressed and the sliding resistance of the valve body 302 increases more in the present embodiment than in the comparative example.

Here, since the valve body 302 cannot rotate smoothly unless the valve driving part 36 can output a torque of the maximum value or more of the rotation torque Tb shown in FIG. 23, a dominant design point of the valve driving part 36 is the maximum value of the rotation torque Tb, namely a peak torque. Then in the present embodiment, the peak torque can be reduced as stated above and hence the valve driving part 36 can be attempted to be downsized. Moreover, since a valve driving part 36 accounts for about a half of the volume of a whole flow passage switching valve in an ordinary flow passage switching valve, the downsizing of the flow passage switching valve 18a can be attempted easily by downsizing the valve driving part 36.

Further, according to the present embodiment, all the four joining parts 345 to 348 are deformed resiliently by being compressed in the valve radial direction DRr by the valve body outer peripheral surface 302a and the main body inner peripheral surface 322 as shown in FIG. 4. The four joining parts 345 to 348 therefore come into contact with the valve body 302 similarly to the four sealing parts 341 to 344 and hence the width of the variation of the rotation torque Tb required when the valve body 302 rotates can be reduced easily.

Furthermore, according to the present embodiment, as shown in FIG. 7, the first joining part 345 is formed so that the width WC1 of the first joining part 345 in a direction parallel with the valve axis CLv may be equal to the sealing width W1 of the first sealing part 341. Then the other second to fourth joining parts 346, 347, and 348 are also similar to the first joining part 345 respectively. In comparison with the configuration of connecting the sealing parts 341 to 344 through a cylindrical wall like Patent Document 1 therefore, it is possible to reduce the amount of a material (for example, a rubber material) used for the sealing member 34 without increasing the number of parts constituting the sealing member 34. In the present embodiment, the number of parts constituting the sealing member 34 is one.

Moreover, according to the present embodiment, the flow passage switching valve 18a constitutes a part of the heat management system 10 shown in FIG. 1 and switches a flow passage in which cold water or warm water flows in the heat management system 10. By downsizing the flow passage switching valve 18a as stated above therefore, the heat management system 10 can be configured compactly.

In addition, according to the present embodiment, as shown in FIG. 4, when the rotational motion of the valve body 302 stops, the valve body 302 stops at a rotation position where the peripheral edges 302d and 302e of both the valve body openings 302b and 302c overlap with none of the first to third sealing parts 341, 342, and 343. It is therefore possible to avoid leaving the sealing member 34 having a resiliency in the state of being unevenly compressed and deformed for a long period of time. As a result, it is possible to: avoid deforming the sealing member 34 locally; and prevent seal leakage causing the performance of the flow passage switching valve 18a to deteriorate from occurring.

Second Embodiment

A second embodiment is explained hereunder. In the present embodiment, points different from the first embodiment are mainly explained. Further, a part identical or equivalent to the above embodiment is omitted or explained by being simplified. This applies similarly to a third embodiment described later.

Figure 24:
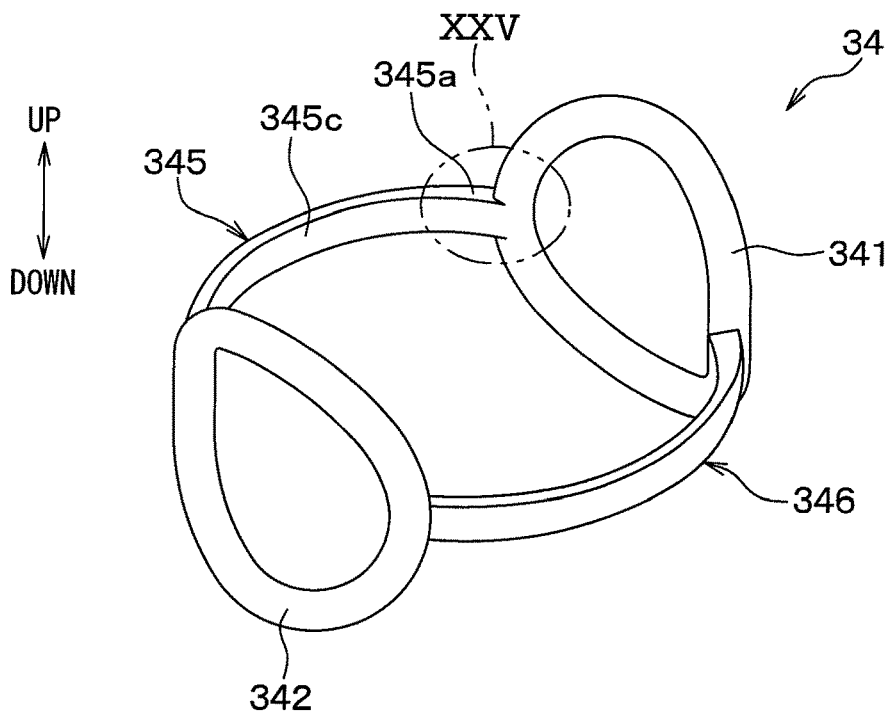
FIG. 24 is a schematic perspective view showing a sealing member alone constituting a flow passage switching valve according to a second embodiment in a free state and corresponding to FIG. 6 according to the first embodiment.
Figure 25:
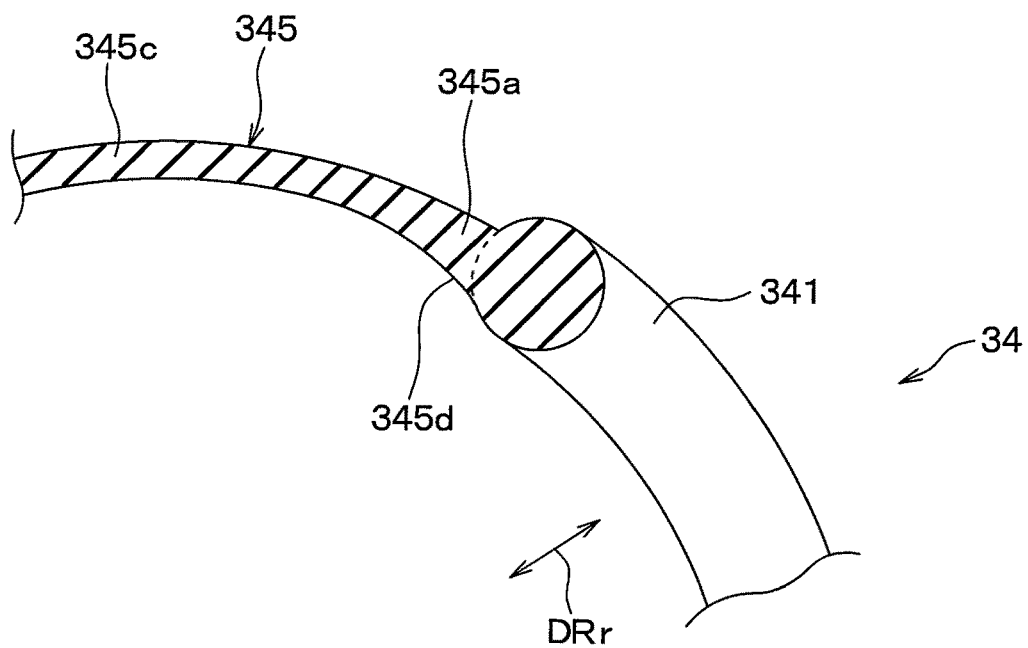
FIG. 25 is a sectional view showing the XXV part in FIG. 24 taken on a virtual cross section passing through the center of a first sealing part and being perpendicular to a valve axis and viewed from the above according to the second embodiment.

As shown in FIGS. 24 and 25, a sealing member 34 according to the present embodiment has two sealing parts 341 and 342 and also two joining parts 345 and 346 and the present embodiment is different from the first embodiment on this point. A valve main body 32 according to the present embodiment therefore has two opening holes 32a and 32b for example although they are not shown in the figures. Further, the shapes of the two joining parts 345 and 346 according to the present embodiment are different from the first embodiment.

Specifically, a first joining part 345 that is one of the two joining parts 345 and 346 has a first joining end portion 345a connected to a first sealing part 341 and a second joining end portion 345b connected to a second sealing part 342 (refer to FIGS. 4 and 6). Further, the first joining part 345 has an intermediate part 345c between the first joining end portion 345a and the second joining end portion 345b. Furthermore, the thickness of the whole first joining part 345 in the valve radial direction DRr is smaller than the thickness of the first sealing part 341 and the second sealing part 342.

Then as shown in FIG. 25, the first joining end portion 345a has an inner circumferential side part 345d extending continuously (for example, smoothly) from the intermediate part 345c toward the first sealing part 341 inside the first joining part 345 in the valve radial direction DRr. This applies also to the second joining end portion 345b. The joining end portions 345a and 345b of the first joining part 345 therefore are deformed resiliently by being pressed by a valve body outer peripheral surface 302a outward in the valve radial direction DRr respectively similarly to the first embodiment.

Here, the term "extending continuously from the intermediate part 345c toward the first sealing part 341" stated above means to include that not only a step does not exist at all but also a step or a surface bent of the extent that a sealing member 34 slides without being caught by peripheral edges 302d and 302e of valve body openings 302b and 302c exists.

Further, the thickness of the first joining part 345 in the valve radial direction DRr is smallest at the intermediate part 345c of the first joining part 345. Then the thickness of the first joining part 345 in the valve radial direction DRr increases gradually from the center part of the first joining part 345 toward the side closer to the first sealing part 341 or the second sealing part 342 in the valve circumferential direction DRc.

Here, the second joining part 346 that is the other part of the two joining parts 345 and 346 has a configuration similar to the first joining part 345 and hence the explanation is omitted.

According to the present embodiment, the effects exhibited by the configuration common to the first embodiment can be obtained similarly to the first embodiment.

Further, according to the present embodiment, the first joining end portion 345a has the inner circumferential side part 345d extending continuously from the intermediate part 345c toward the first sealing part 341 inside the first joining part 345 in the valve radial direction DRr. This applies also to the second joining end portion 345b of the first joining part 345 and both the ends of the second joining part 346. The steps between the joining parts 345 and 346 and the sealing parts 341 and 342 respectively are therefore inhibited inside the sealing member 34 in the valve radial direction DRr. Consequently, the sealing parts 341 and 342 are not easily caught by the peripheral edges 302d and 302e of the valve body openings 302b and 302c (refer to FIG. 4) when the valve body 302 rotates. As a result, the maximum value of a rotation torque Tb for rotating the valve body 302 can be reduced.

Third Embodiment

The third embodiment is explained hereunder. In the present embodiment, points different from the second embodiment are mainly explained.

Figure 26:
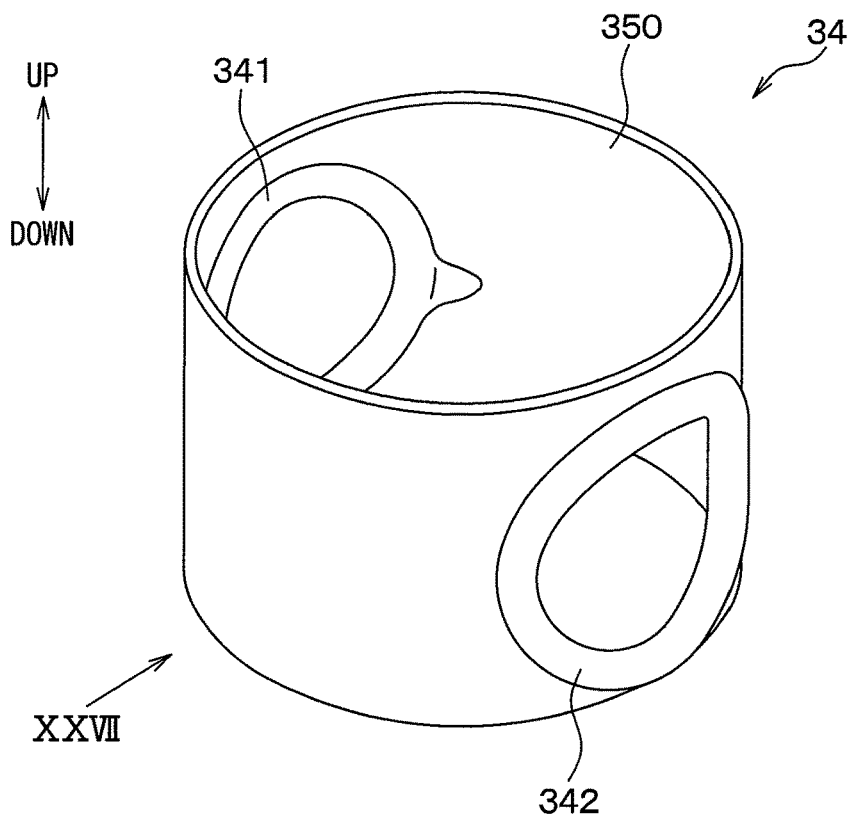
FIG. 26 is a schematic perspective view showing a sealing member alone constituting a flow passage switching valve according to a third embodiment in a free state and corresponding to FIG. 24 according to the second embodiment.
Figure 27:
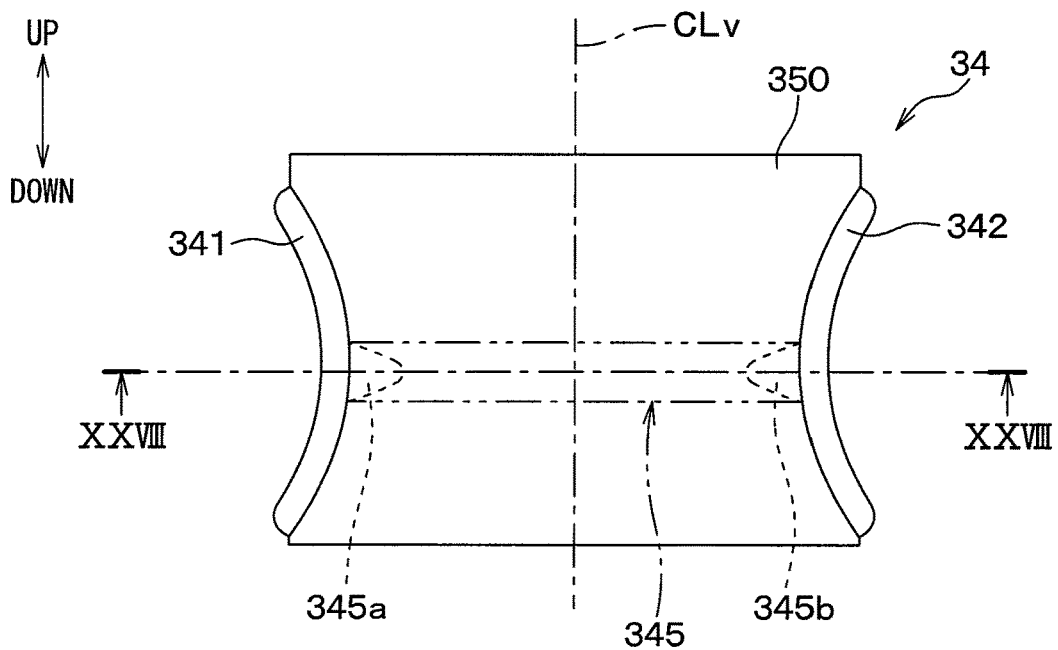
FIG. 27 is a view taken in the direction of the arrow XXVII in FIG. 26.

As shown in FIGS. 26 and 27, a sealing member 34 according to the present embodiment has a tubular part 350 of a cylindrical shape having a valve axis CLv in the center. The present embodiment is different from the second embodiment on this point.

Specifically, the tubular part 350 plays the role of a connecting wall to connect a first sealing part 341 and a second sealing part 342. As shown by the long dashed double-short dashed line in FIG. 27 therefore, a first joining part 345 and a second joining part 346 are configured as parts of the tubular part 350.

Figure 28:
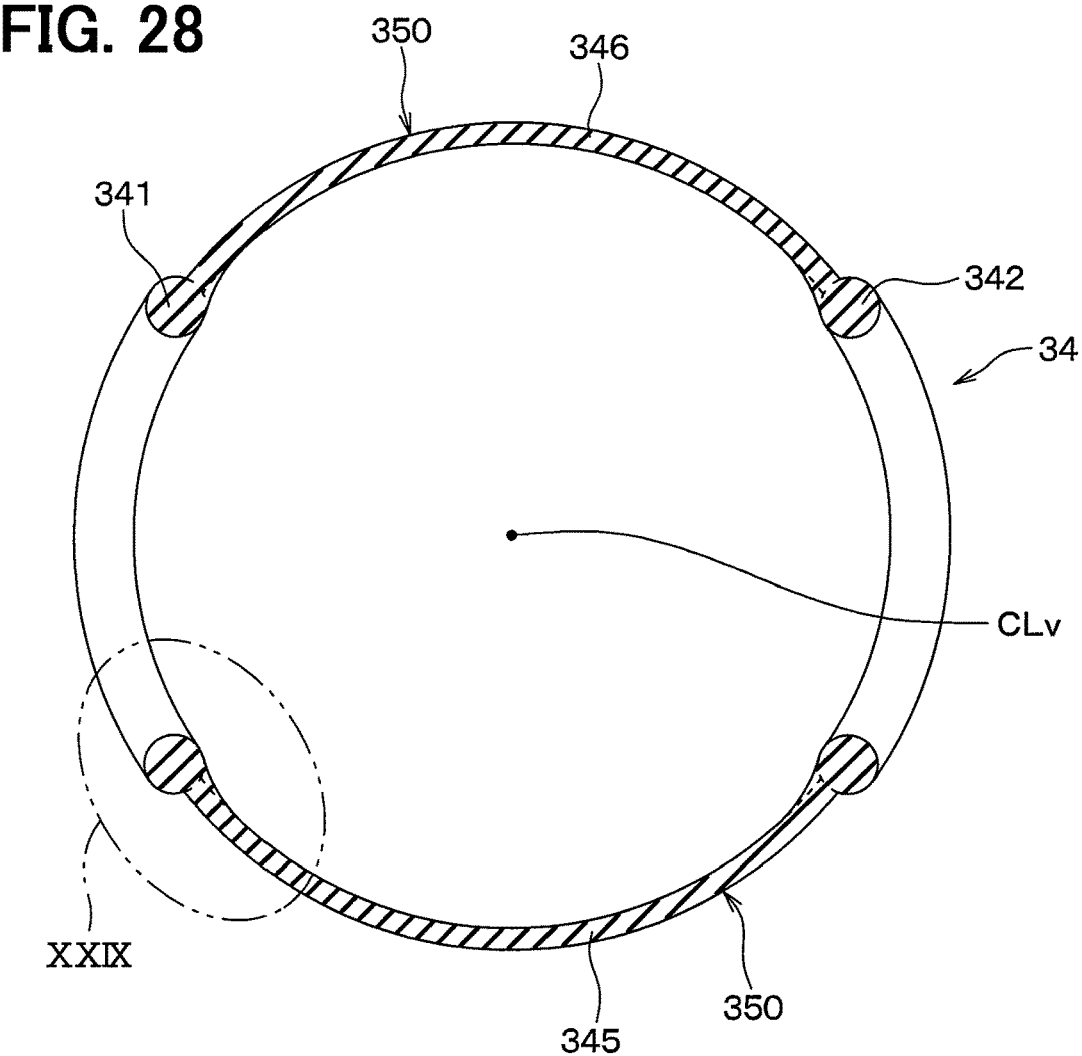
FIG. 28 is a sectional view taken on line XXVIII-XXVIII in FIG. 27 according to the third embodiment.
Figure 29:
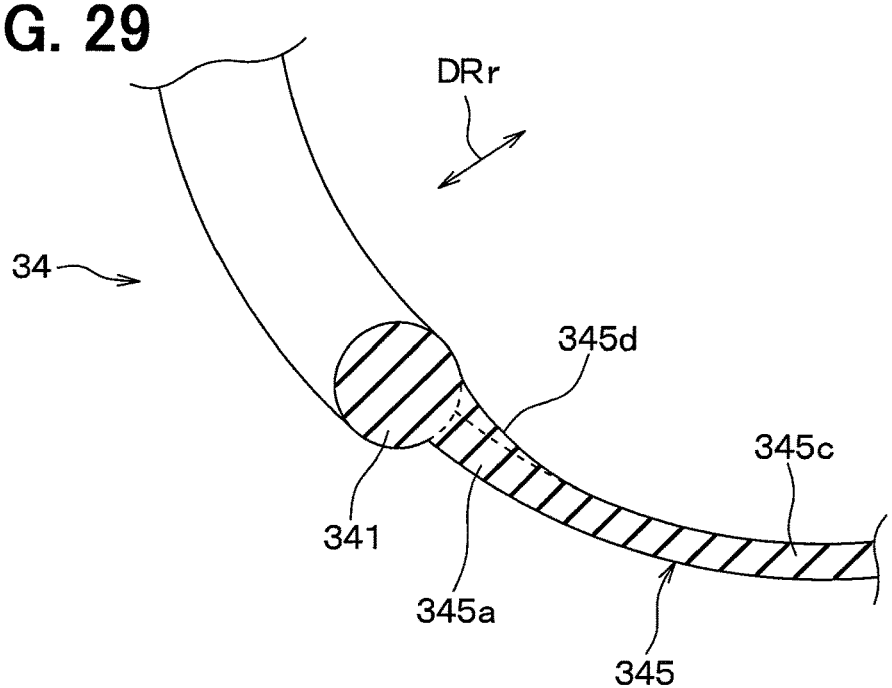
FIG. 29 is an enlarged detailed view showing the XXIX part in FIG. 28.

Here, the configuration of the first joining part 345 and the second joining part 346 is similar to the second embodiment except that the first joining part 345 and the second joining part 346 are included in the tubular part 350. As shown in FIGS. 28 and 29 for example, a first joining end portion 345a of the first joining part 345 has an inner circumferential side part 345d similar to the second embodiment.

Meanwhile, the thickness in a valve radial direction DRr, namely the thickness in a radial direction, of the tubular part 350 is the same as the thickness of an intermediate part 345c of the first joining part 345 and an intermediate part of the second joining part 346 for example. The intermediate part of the second joining part 346 is a part of the second joining part 346 corresponding to the intermediate part 345c of the first joining part 345.

According to the present embodiment, the effects exhibited by the configuration common to the second embodiment can be obtained similarly to the second embodiment.

Further, according to the present embodiment, the sealing member 34 is formed cylindrically around the valve axis CLv and has the tubular part 350 connecting the first sealing part 341 and the second sealing part 342. Then the first joining part 345 and the second joining part 346 are configured as parts of the tubular part 350. It is therefore possible to lock the sealing member 34 so as to be incapable of rotating relatively to a valve main body 32 by locking the tubular part 350 to the valve main body 32.

Meanwhile, the present embodiment is a modified example based on the second embodiment but the present embodiment can also be combined with the first embodiment.

Fourth Embodiment

A fourth embodiment is explained hereunder. In the present embodiment, points different from the third embodiment are mainly explained.

Figure 30:
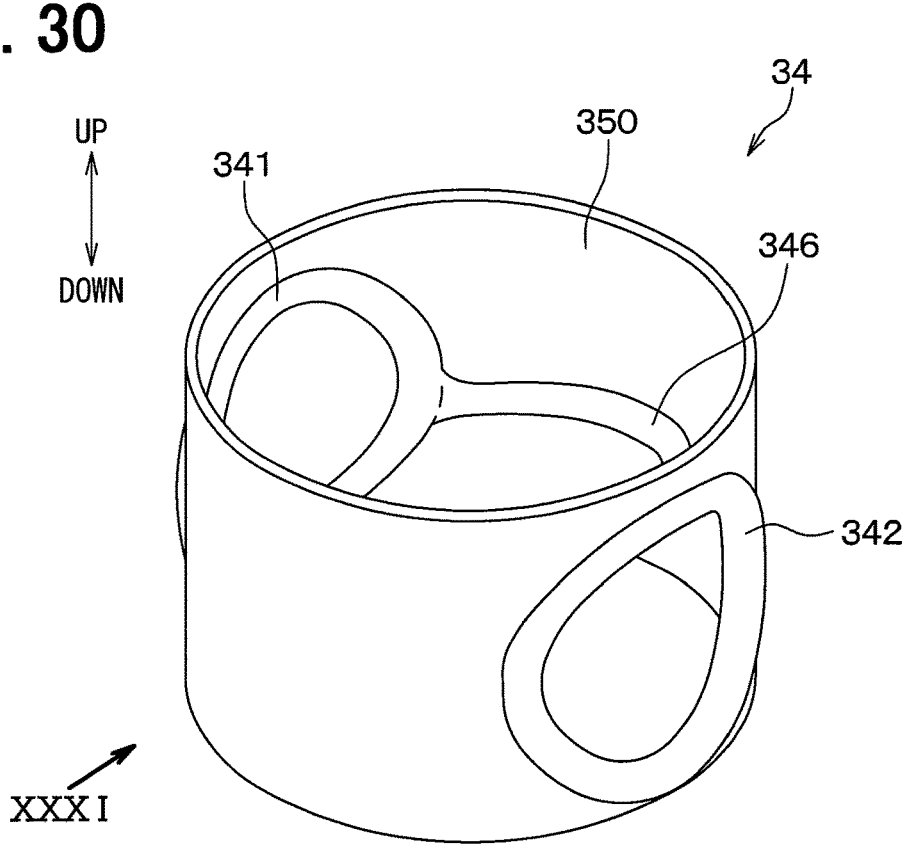
FIG. 30 is a schematic perspective view showing a sealing member alone constituting a flow passage switching valve according to a fourth embodiment in a free state and corresponding to FIG. 26 according to the third embodiment.
Figure 31:
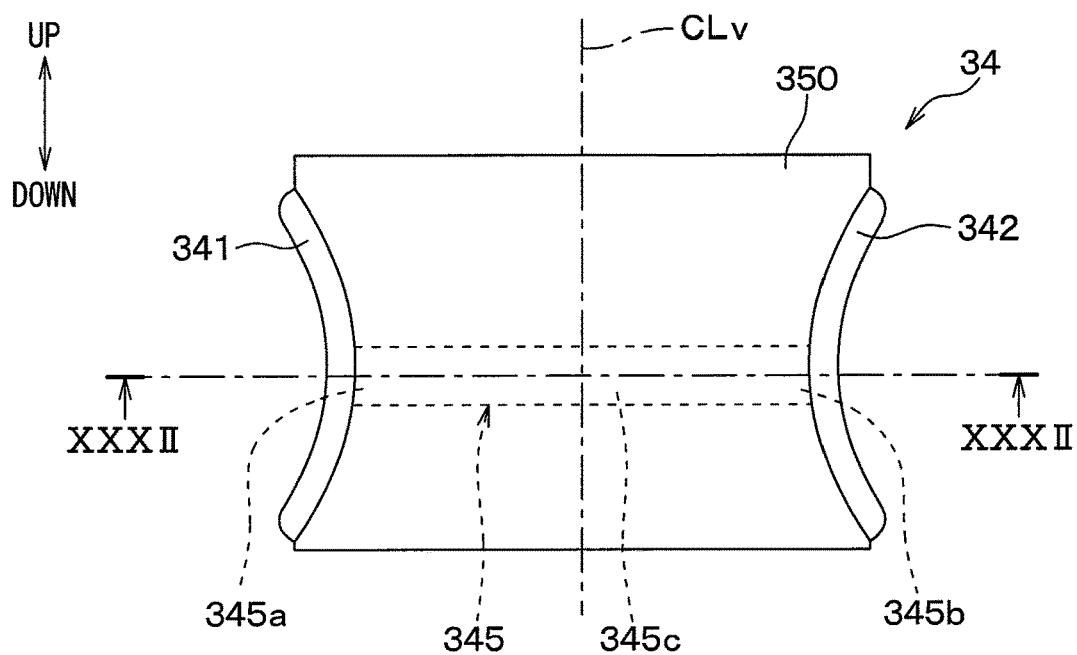
FIG. 31 is a view being taken in the direction of the arrow XXXI in FIG. 30 and corresponding to FIG. 27 according to the third embodiment.
Figure 32:
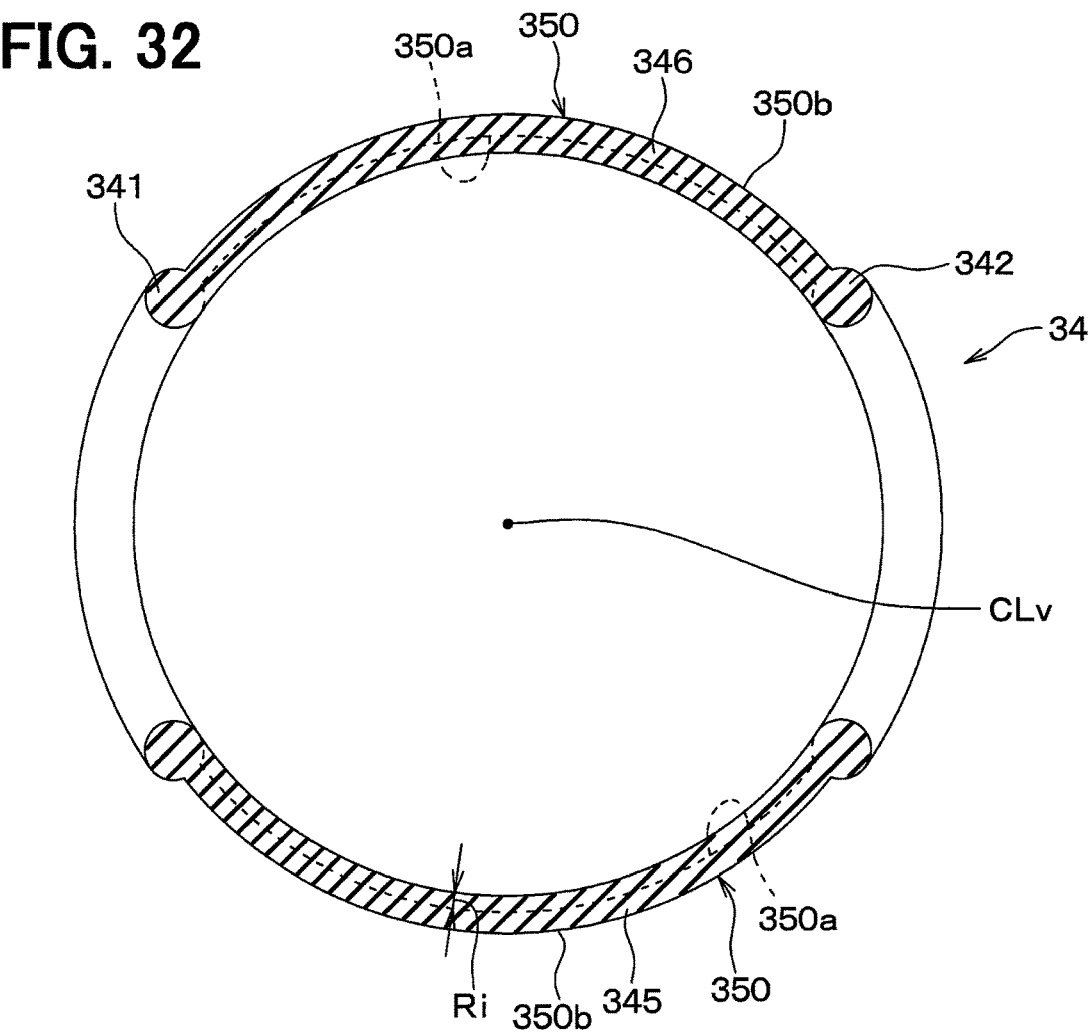
FIG. 32 is a sectional view being taken on line XXXII-XXXII in FIG. 31 according to the fourth embodiment and corresponding to FIG. 28 according to the third embodiment.

As shown in FIGS. 30 to 32, in the present embodiment, the shapes of joining parts 345 and 346 of a sealing member 34 are different from the third embodiment.

Specifically, the thickness of the first joining part 345 in a valve radial direction DRr, namely the radial direction thickness of the first joining part 345, is uniform over the whole length of the first joining part 345 in a valve circumferential direction DRc. Then the first joining part 345 bulges inward in the valve radial direction DRr from an inner peripheral surface 350a of a tubular part 350 formed around the first and second joining parts 345 and 346. For example, the amount Ri of an inward bulge of the first joining part 345 from the inner peripheral surface 350a is identical to or the same level as both sealing parts 341 and 342.

In the present embodiment, the first joining part 345 neither bulges nor sinks from an outer peripheral surface 350b of the tubular part 350 formed around the first and second joining parts 345 and 346.

Here, the second joining part 346 is also configured similarly to the first joining part 345.

According to the present embodiment, the effects exhibited by the configuration common to the third embodiment can be obtained similarly to the third embodiment.

Meanwhile, the present embodiment is a modified example based on the third embodiment but the present embodiment can also be combined with the first embodiment.

Fifth Embodiment

A fifth embodiment is explained hereunder. In the present embodiment, points different from the fourth embodiment are mainly explained.

Figure 33:
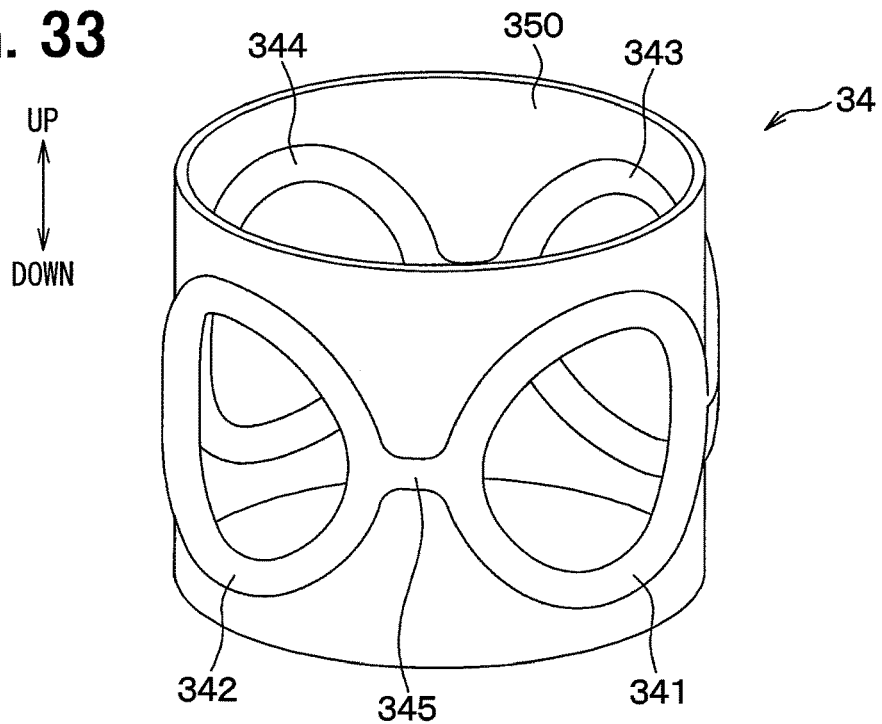
FIG. 33 is a schematic perspective view showing a sealing member alone constituting a flow passage switching valve according to a fifth embodiment in a free state and corresponding to FIG. 30 according to the fourth embodiment.

As shown in FIG. 33, in the present embodiment, a sealing member 34 has four sealing parts 341 to 344 and four joining parts 345 to 348 similarly to the first embodiment. Then the four joining parts 345 and 348 bulge from an outer peripheral surface 350b of a tubular part 350 outward in a valve radial directions DRr, respectively. For example, the amounts of outward bulges of the joining parts 345 to 348 from the outer peripheral surface 350b are identical to or the same level as all the sealing parts 341 and 344, respectively. The present embodiment is different from the fourth embodiment on those points.

Further, when attention is paid to the four sealing parts 341 to 344 and four joining parts 345 to 348 of the sealing member 34 according to the present embodiment, the shapes of the sealing parts 341 to 344 and the four joining parts 345 to 348 are the same as the first embodiment.

According to the present embodiment, the effects exhibited by the configuration common to the fourth embodiment can be obtained similarly to the fourth embodiment.

Other Embodiments (1) Although a flow passage switching valve 18a in FIG. 2 is used in a heat management system 10 in each of the above embodiments, the application of a flow passage switching valve 18a is not limited to a heat management system 10.

(2) Although a flow passage switching valve 18a in FIG. 2 is a three-way valve in each of the above embodiments, a flow passage switching valve 18a may also be a four-way valve or an on-off valve to open and close a flow passage of a fluid (namely an isolation valve). Further, in a valve body 302, not only valve body openings 302b and 302c formed on a valve body outer peripheral surface 302a but also a lower part opening 302f formed on an undersurface of the valve body 302 may be arranged as shown in FIG. 34 for example.

Figure 34:
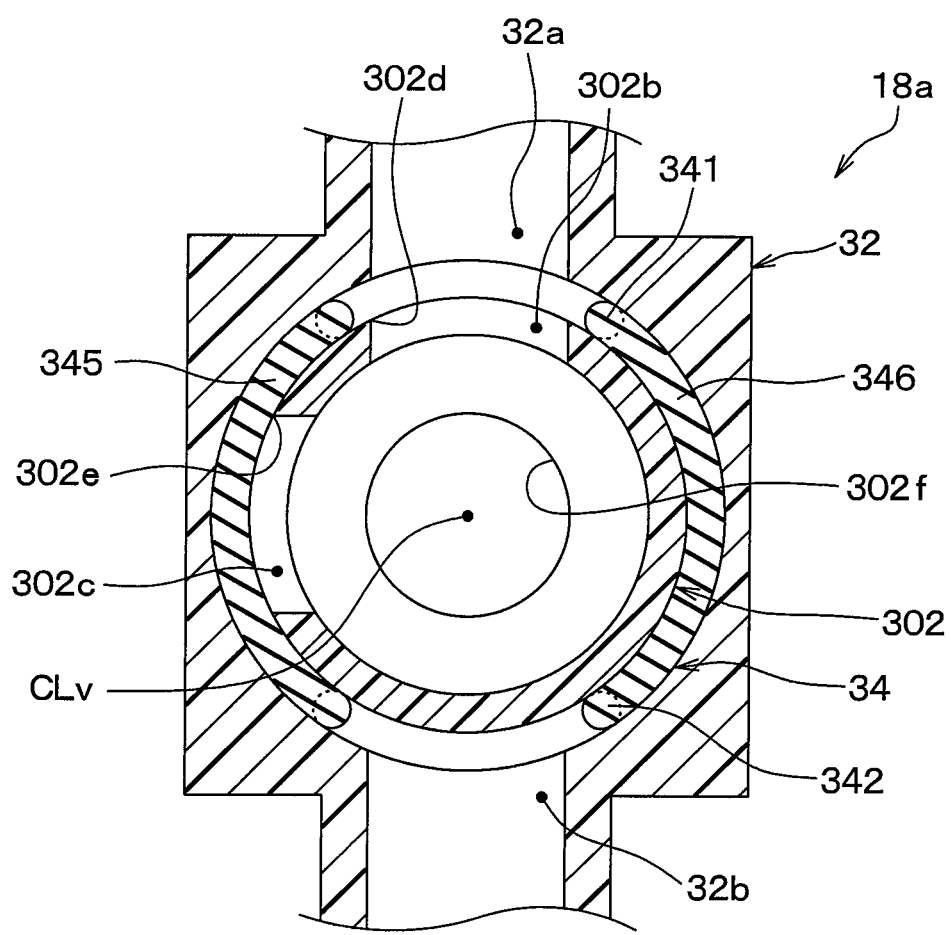
FIG. 34 is a sectional view of a flow passage switching valve according to a modified example of the first embodiment being taken on the same cross section as FIG. 4 and corresponding to FIG. 4 according to the first embodiment.

In a flow passage switching valve 18a in FIG. 34, the lower part opening 302f communicates with an external pipe outside the flow passage switching valve 18a regardless of a rotation position of the valve body 302. Then the flow passage switching valve 18a in FIG. 34 is configured as a three-way valve connecting the external pipe alternatively to a first opening hole 32a and a second opening hole 32b.

For example, at the rotation position of the valve body 302 shown in FIG. 34, the external pipe connected to the lower part opening 302f communicates with the first opening hole 32a through the first valve body opening 302b. Then when the valve body 302 rotates counterclockwise by an angle of 90° from the rotation position in FIG. 34, the external pipe communicates with the second opening hole 32b through the second valve body opening 302c.

Meanwhile, in the first embodiment, the valve body 302 stops at a rotation position where the peripheral edges 302d and 302e of both the valve body openings 302b and 302c formed on the valve body outer peripheral surface 302a of the valve body 302 overlap with none of the first to third sealing parts 341, 342, and 343. In this regard, as shown in FIG. 34 for example, the valve body 302 may stop at a position where one of peripheral edges 302d and 302e of the valve body openings 302b and 302c formed on the valve body outer peripheral surface 302a overlaps with joining parts 345 and 346, which connect together a first sealing part 341 and a second sealing part 342. This is because the sealing performance of a sealing member 34 is not affected. In FIG. 34 for example, the valve body 302 stops at a position where the peripheral edge 302e of the second valve body opening 302c overlaps with the first joining part 345.

Further, the flow passage switching valve 18a in FIG. 34 may eliminate one of the two valve body openings 302b and 302c of the valve body 302. This is because the flow passage switching valve 18a can function as a three-way valve by rotating the valve body 302 by an angle of 180°.

(3) In the first embodiment, the three opening holes 32a, 32b, and 32c are arranged in the valve main body 32 in FIG. 4. In this regard, as long as the names of the three opening holes 32a, 32b, and 32c are different from each other, any one of the opening holes 32a, 32b, and 32c may be called a first opening hole, a second opening hole, or a third opening hole. Same applies also to the names of the three sealing parts 341, 342, and 343 excluding the fourth sealing part 344 that does not correspond to an opening hole of the valve main body 32.

(4) In each of the above embodiments, a valve body 302 stops at a rotation position where peripheral edges 302d and 302e of both valve body openings 302b and 302c formed on a valve body outer peripheral surface 302a overlap with none of first to third sealing parts 341, 342, and 343. This process is desirable for keeping the sealing performance of a sealing member 34.

As long as the sealing performance of the sealing member 34 is kept however, that process is not necessarily required. For example, the valve body 302 may also stop at a rotation position where the peripheral edges 302d and 302e of both the valve body openings 302b and 302c overlap with none of the first to third sealing parts 341, 342, and 343 when an engine stops.

Even by such a process, it is possible to avoid leaving the sealing member 34 in the state of being unevenly compressed and deformed for a long period of time similarly to each of the above embodiments. It is therefore possible to prevent seal leakage from occurring. Further, whether or not an engine has stopped can be determined on the basis of an operation signal of an ignition switch, a detection signal of an engine rotation speed sensor, or the like for example.

(5) In the second embodiment, both the joining parts 345 and 346 of the sealing member 34 are configured so as not to be detachable in the middle of the joining parts 345 and 346. This is only an example however and one of the joining parts 345 and 346 of the sealing member 34 may also be configured so as to be detachable in the middle in the valve circumferential direction DRc.

Figure 35:
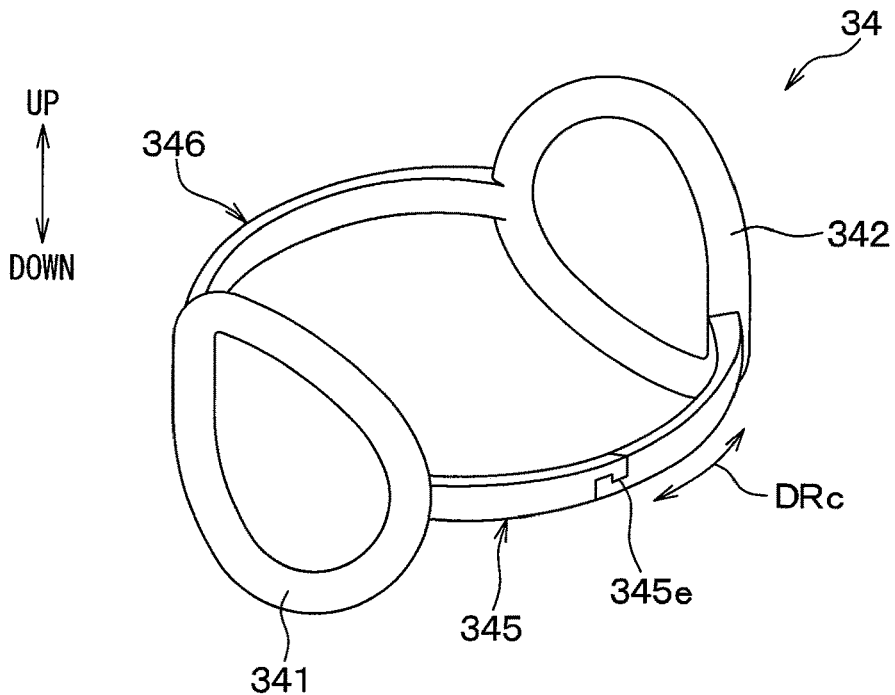
FIG. 35 is a schematic perspective view showing a sealing member alone constituting a flow passage switching valve according to a first modified example of the second embodiment in a free state and corresponding to FIG. 24 according to the second embodiment.

In the case of FIG. 35 for example, a first joining part 345 is configured so as to be detachable in the middle in a valve circumferential direction DRc. That is, the first joining part 345 has a detachable part 345e configured so as to be detachable in the middle of the first joining part 345 in the valve circumferential direction DRc. The structure of the detachable part 345e is assumed variously but, as shown in FIG. 35 for example, the detachable part 345e is coupled so as to be able to withstand a tensile force in the valve circumferential direction DRc by fitting claws to each other.

By configuring the sealing member 34 like the case shown in FIG. 35, the sealing member 34 alone can be developed on a plane for example. The sealing member 34 therefore can be manufactured in the state of detaching the first joining part 345 at a process of manufacturing the part alone of the sealing member 34. Then at a process after manufacturing the sealing member 34, for example at a process of assembling a flow passage switching valve 18a, it is possible to: connect one side and the other side of the first joining part 345 interposing the detachable part 345e to each other; and make the sealing member 34 annular.

(6) In the second embodiment, the first sealing part 341 and the second sealing part 342 are connected to each other through the two joining parts 345 and 346. In this regard, the sealing member 34 may also be shaped so as to be cut at a center part of one of the two joining parts 345 and 346.

Figure 36:
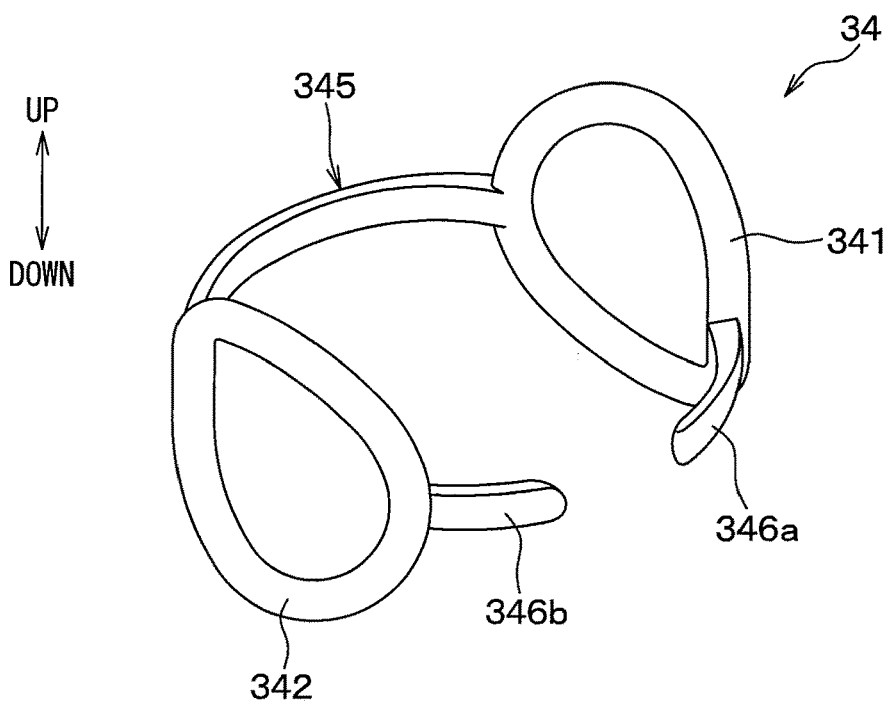
FIG. 36 is a schematic perspective view showing a sealing member alone constituting a flow passage switching valve according to a second modified example of the second embodiment in a free state and corresponding to FIG. 24 according to the second embodiment.

In the case of FIG. 36 for example, a second joining part 346 is replaced with a first sealing extension 346a and a second sealing extension 346b, those being detached from each other. The first sealing extension 346a corresponds to the region on the side of a first sealing part 341 obtained by detaching the second joining part 346 at a center part in a valve circumferential direction DRc and is formed in the manner of extending from the first sealing part 341. Further, the second sealing extension 346b corresponds to the region on the side of a second sealing part 342 obtained by detaching the second joining part 346 at the center part in the valve circumferential direction DRc and is formed in the manner of extending from the second sealing part 342.

By configuring a sealing member 34 like the case shown in FIG. 36, the sealing member 34 alone can be developed on a plane for example similarly to the case of FIG. 35. Then the sealing member 34 of FIG. 36 has a circular or nearly circular shape by being incorporated into a valve chamber 321.

(7) In each of the above embodiments, warm water discharged from a warm water pump 14: is heated by a water-cooled condenser 122 in a heat management system 10 of FIG. 1; but may also be heated by another heating source such as an engine for example.

Further, the present disclosure is not limited to the above embodiments. The present disclosure includes various modified examples and modifications in equivalent ranges. Furthermore, the above embodiments are not unrelated to each other and can be combined appropriately except the case where the combination is obviously unacceptable.

Moreover, in each of the above embodiments, it goes without saying that a component constituting an embodiment is not necessarily essential except the cases of being specified as particularly essential and being thought to be obviously essential in principle and other cases.

In addition, in each of the above embodiments, when a numerical value such as a number of constituent components, a quantity, a range, or the like in an embodiment is referred to, the numerical value is not limited to the specific number except the cases of being specified as particularly essential and being limited obviously to a specific number in principle and other cases. Further, in each of the above embodiments, when a material, a shape, a positional relationship, or the like of a constituent component or the like is referred to, it is not limited to the material, the shape, the positional relationship, or the like except the cases of being specified particularly and being limited to the specific material, shape, positional relationship, or the like in principle and other cases.

To sum up, in a first aspect illustrated by a part or all of the above embodiments, a joining part of a sealing member has a first joining end connected to a first sealing part and a second joining end connected to a second sealing part. Further, the joining part is arranged at a portion where a mutual interval between the first sealing part and the second sealing part is smallest in a circumferential direction. Then at least the first joining end and the second joining end of the joining part deform resiliently by being pressed by a valve body outer peripheral surface outward in a valve radial direction, respectively.

In a second aspect, a joining part deforms resiliently by being compressed by a valve body outer peripheral surface and a main body inner circumferential surface in a valve radial direction. The joining part therefore comes into contact with a valve body similarly to first and second sealing parts and hence the width of the variation of a rotation torque required when the valve body rotates can be reduced easily.

In a third aspect, a joining part has an intermediate part between a first joining end and a second joining end. Then the first joining end has an inner circumferential side extending continuously from the intermediate part toward a first sealing part inside the joining part in a valve radial direction. Inside a sealing member in the radial direction therefore, a step between the first joining end and the first sealing part is inhibited and the first sealing part is not easily caught by a periphery of a valve body opening when a valve body rotates. As a result, the maximum value of a torque to rotate the valve body can be reduced.

In a fourth aspect, a joining part is configured so as to be detachable in the middle in a circumferential direction. It is therefore possible to: detach the joining part at a process of manufacturing the part alone of a sealing member beforehand; and then connect the joining part after the sealing member is manufactured, for example at a process of assembling a flow passage switching valve.

In a fifth aspect, a sealing member is shaped cylindrically around a valve axis and has a cylindrical part to connect a first sealing part and a second sealing part. Then a joining part is configured as a part of the cylindrical part. By locking the cylindrical part to a valve main body therefore, it is possible to lock the sealing member so as to be incapable of rotating relatively to the valve main body.

In a sixth aspect, a joining part bulges inward in a valve radial direction from an inner circumferential surface of a cylindrical part formed around the joining part.

In a seventh aspect, a joining part bulges outward in a valve radial direction from an outer peripheral surface of a cylindrical part formed around the joining part.

In an eighth aspect, a joining part is formed so that the width of the joining part in a direction parallel with the valve axis may be equal to the sealing width of a first sealing part. It is therefore possible to reduce the amount of a material used for a sealing member without increasing the number of parts constituting the sealing member in comparison with such a configuration of connecting sealing parts through a cylindrical wall as described in Patent Document 1.

In a ninth aspect, a flow passage switching valve constitutes a part of a heat management system and switches the flow of a fluid in the heat management system. It is therefore possible to configure the heat management system compactly by downsizing the flow passage switching valve.

In a tenth aspect, a valve body stops at a rotation position where all the peripheries of a valve body opening overlap with neither of a first sealing part and a second sealing part when the rotational motion of the valve body stops. It is therefore possible to avoid leaving a sealing member having a resiliency in the state of being unevenly compressed and deformed for a long period of time. As a result, the sealing member is inhibited from being deformed locally and can prevent seal leakage causing the performance of a flow passage switching valve to deteriorate from occurring.

In an eleventh aspect, a valve body stops at a rotation position where all the peripheries of a valve body opening overlap with neither of a first sealing part and a second sealing part when an engine stops. It is therefore possible to avoid leaving a sealing member in the state of being unevenly compressed and deformed for a long period of time similarly to the above aspect. As a result, it is possible to prevent seal leakage from occurring.

What is claimed is:

1. A flow passage switching valve for switching a flow passage through which fluid flows or for opening or closing the flow passage, the valve comprising:
   a valve body that rotates around a valve axis and includes a valve body outer peripheral surface, which faces outward in a valve radial direction and extends to surround the valve axis, wherein the valve radial direction is a radial direction of the valve axis;
   a valve main body that includes:
      a valve chamber accommodating the valve body; and
      a main body inner peripheral surface opposed to the valve body outer peripheral surface and facing the valve chamber; and
   a resilient sealing member that is accommodated in the valve chamber and is placed outward of the valve body in the valve radial direction to be interposed between the valve body outer peripheral surface and the main body inner peripheral surface in the valve radial direction, wherein:
   the valve main body further includes a first opening hole and a second opening hole each passing through the valve main body from the valve chamber in the valve radial direction;
   the second opening hole is located side by side with the first opening hole in a circumferential direction of the valve axis;
   the valve body includes one or at least two valve body openings that open outward in the valve radial direction;
   the one or at least two valve body openings communicate with one of the first opening hole and the second opening hole in accordance with a rotation position of the valve body;
   the sealing member includes:
      a first sealing part and a second sealing part each being clamped between the valve body outer peripheral surface and the main body inner peripheral surface; and
      a joining part connecting together the first sealing part and the second sealing part;
   the first sealing part extends to surround a peripheral edge of the first opening hole on the main body inner peripheral surface side;
   when one opening of the one or at least two valve body openings communicates with the first opening hole, the first sealing part prevents a leak of the fluid flowing between the one opening and the first opening hole;
   the second sealing part extends to surround a peripheral edge of the second opening hole on the main body inner peripheral surface side;
   when the one opening of the one or at least two valve body openings communicates with the second opening hole, the second sealing part prevents a leak of the fluid flowing between the one opening and the second opening hole;
   the joining part includes a first joining end portion connected to the first sealing part and a second joining end portion connected to the second sealing part, and is placed at a position where a mutual interval between the first sealing part and the second sealing part is the smallest in the circumferential direction;
   each of at least the first joining end portion and the second joining end portion of the joining part is pressed outward in the valve radial direction by the valve body outer peripheral surface to be resiliently deformed;
   the sealing member further includes a tubular part that has a tubular shape around the valve axis and that connects together the first sealing part and the second sealing part;
   the joining part is configured as a part of the tubular part; and
   the joining part bulges outward of an outer peripheral surface of the tubular part formed around the joining part, in the valve radial direction.

2. The flow passage switching valve according to claim 1, wherein the joining part is compressed in the valve radial direction by the valve body outer peripheral surface and the main body inner peripheral surface to be resiliently deformed.

3. The flow passage switching valve according to claim 1, wherein:
   the first sealing part extends around the first opening hole with a predetermined sealing width in a radial direction of the first opening hole, to be formed annularly; and
   the joining part is formed so that a width of the joining part in a direction of the valve axis is equal to the sealing width.

4. The flow passage switching valve according to claim 1, wherein:
   the flow passage switching valve constitutes a heat management system including a refrigeration cycle that cools a first heat exchange medium;
   the first heat exchange medium and a second heat exchange medium, which has a higher temperature than the first heat exchange medium, circulate through the heat management system;
   the heat management system supplies the first heat exchange medium or the second heat exchange medium to each of a plurality of devices; and
   the flow passage switching valve switches a flow of the fluid serving as the first heat exchange medium or the second heat exchange medium in the heat management system.

5. The flow passage switching valve according to claim 1, wherein when the rotation of the valve body stops, the valve body stops at a rotation position where no peripheral edges of the one or at least two valve body openings overlap with any of the first sealing part and the second sealing part.

6. The flow passage switching valve according to claim 1, wherein:
   the flow passage switching valve is placed in a vehicle having an engine for traveling; and
   when the engine stops, the valve body stops at a rotation position where no peripheral edges of the one or at least two valve body openings overlap with any of the first sealing part and the second sealing part.

7. A flow passage switching valve for switching a flow passage through which fluid flows or for opening or closing the flow passage, the valve comprising:
- a valve body that rotates around a valve axis and includes a valve body outer peripheral surface, which faces outward in a valve radial direction and extends to surround the valve axis, wherein the valve radial direction is a radial direction of the valve axis;
- a valve main body that includes:
  - a valve chamber accommodating the valve body; and
  - a main body inner peripheral surface opposed to the valve body outer peripheral surface and facing the valve chamber; and
- a resilient sealing member that is accommodated in the valve chamber and is placed outward of the valve body in the valve radial direction to be interposed between the valve body outer peripheral surface and the main body inner peripheral surface in the valve radial direction, wherein:
- the valve main body further includes a first opening hole and a second opening hole each passing through the valve main body from the valve chamber in the valve radial direction;
- the second opening hole is located side by side with the first opening hole in a circumferential direction of the valve axis;
- the valve body includes one or at least two valve body openings that open outward in the valve radial direction;
- the one or at least two valve body openings communicate with one of the first opening hole and the second opening hole in accordance with a rotation position of the valve body;
- the sealing member includes:
  - a first sealing part and a second sealing part each being clamped between the valve body outer peripheral surface and the main body inner peripheral surface; and
  - a joining part connecting together the first sealing part and the second sealing part;
- the first sealing part extends to surround a peripheral edge of the first opening hole on the main body inner peripheral surface side;
- when one opening of the one or at least two valve body openings communicates with the first opening hole, the first sealing part prevents a leak of the fluid flowing between the one opening and the first opening hole;
- the second sealing part extends to surround a peripheral edge of the second opening hole on the main body inner peripheral surface side;
- when the one opening of the one or at least two valve body openings communicates with the second opening hole, the second sealing part prevents a leak of the fluid flowing between the one opening and the second opening hole;
- the joining part includes a first joining end portion connected to the first sealing part and a second joining end portion connected to the second sealing part, and is placed at a position where a mutual interval between the first sealing part and the second sealing part is the smallest in the circumferential direction;
- each of at least the first joining end portion and the second joining end portion of the joining part is pressed outward in the valve radial direction by the valve body outer peripheral surface to be resiliently deformed;
- the at least two valve body opening are formed in a circular shape;
- the first and second sealing parts are formed in a circular shape along the circular shape of the at least two valve body openings; and
- the joining part is placed at a center of the first and second sealing parts in a direction of the valve axis.

8. The flow passage switching valve according to claim 7, wherein:
- the first sealing part extends around the first opening hole with a predetermined sealing width in a radial direction of the first opening hole, to be formed annularly; and
- the joining part is formed so that a width of the joining part in a direction of the valve axis is equal to the sealing width.

9. The flow passage switching valve according to claim 7, wherein:
- the flow passage switching valve constitutes a heat management system including a refrigeration cycle that cools a first heat exchange medium;
- the first heat exchange medium and a second heat exchange medium, which has a higher temperature than the first heat exchange medium, circulate through the heat management system;
- the heat management system supplies the first heat exchange medium or the second heat exchange medium to each of a plurality of devices; and
- the flow passage switching valve switches a flow of the fluid serving as the first heat exchange medium or the second heat exchange medium in the heat management system.

10. The flow passage switching valve according to claim 7, wherein
when the rotation of the valve body stops, the valve body stops at a rotation position where no peripheral edges of the one or at least two valve body openings overlap with any of the first sealing part and the second sealing part.

11. The flow passage switching valve according to claim 7, wherein:
- the flow passage switching valve is placed in a vehicle having an engine for traveling; and
- when the engine stops, the valve body stops at a rotation position where no peripheral edges of the one or at least two valve body openings overlap with any of the first sealing part and the second sealing part.

* * * * *